US011491968B2

(12) United States Patent
Nakanishi et al.

(10) Patent No.: US 11,491,968 B2
(45) Date of Patent: Nov. 8, 2022

(54) CONTROL DEVICE OF HYBRID VEHICLE

(71) Applicants: TOYOTA JIDOSHA KABUSHIKI KAISHA, Toyota (JP); AISIN AW CO., LTD., Anjo (JP)

(72) Inventors: Naoki Nakanishi, Nagoya (JP); Nobufusa Kobayashi, Okazaki (JP); Masato Yoshikawa, Toyota (JP); Hironobu Aratake, Chiryu (JP); Shingo Akita, Toyota (JP); Shinobu Nishiyama, Anjo (JP); Soichiro Sawamura, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 87 days.

(21) Appl. No.: 17/214,898

(22) Filed: Mar. 28, 2021

(65) Prior Publication Data

US 2021/0300331 A1 Sep. 30, 2021

(30) Foreign Application Priority Data

Mar. 30, 2020 (JP) .............................. JP2020-061531

(51) Int. Cl.
| | |
|---|---|
| *B60W 20/40* | (2016.01) |
| *B60W 10/06* | (2006.01) |
| *B60W 10/08* | (2006.01) |
| *B60W 10/10* | (2012.01) |
| *F02D 41/06* | (2006.01) |
| *B60W 20/30* | (2016.01) |
| *B60W 10/02* | (2006.01) |

(52) U.S. Cl.
CPC ............ *B60W 20/40* (2013.01); *B60W 10/02* (2013.01); *B60W 10/06* (2013.01); *B60W 10/08* (2013.01);

(Continued)

(58) Field of Classification Search
CPC ......... F02D 2200/101; F02D 2200/602; F02D 29/02; F02D 41/0215; B60W 10/02;
(Continued)

(56) References Cited

U.S. PATENT DOCUMENTS 6,430,483 B2 * 8/2002 Takaoka .............. B60L 15/2054
701/84
8,187,146 B2 * 5/2012 Allgaier ................ B60W 20/00
180/65.28

(Continued)

FOREIGN PATENT DOCUMENTS

| JP | 2006348863 A | 12/2006 |
| JP | 2014151907 A | 8/2014 |
| WO | 2006134439 A1 | 12/2006 |

*Primary Examiner* — Carl C Staubach
(74) *Attorney, Agent, or Firm* — Hunton Andrews Kurth LLP

(57) ABSTRACT

A control device of a hybrid vehicle including an engine, motor that receives power from the engine via an engine connecting and disconnecting device, and automatic transmission, starts the engine in a first starting method in which the engine performs ignition and rotates by itself after the engine speed is increased to be equal to or higher than a predetermined rotational speed through slipping engagement of the engine connecting and disconnecting device, or a second starting method in which the engine performs ignition and rotates by itself from a stage before the engine speed reaches the predetermined rotational speed, and controls the automatic transmission to permit a lower gear position to be established according to shift conditions when the engine is started in the second starting method during a downshift of the automatic transmission, as compared with when the engine is started in the first starting method during the downshift.

8 Claims, 12 Drawing Sheets

(52) U.S. Cl.
CPC ............ *B60W 10/10* (2013.01); *B60W 20/30* (2013.01); *F02D 41/062* (2013.01); *B60W 2510/0241* (2013.01)

(58) Field of Classification Search
CPC ...... B60W 10/06; B60W 10/08; B60W 10/10; B60W 10/11; B60W 20/40; B60W 2510/0241; B60W 2510/081; B60W 2710/1005
See application file for complete search history.

(56) References Cited

U.S. PATENT DOCUMENTS

| | | | | |
|---|---|---|---|---|
| 8,718,846 | B2* | 5/2014 | Shin | B60W 30/192 |
| | | | | 701/22 |
| 9,205,832 | B2* | 12/2015 | Tsutsumi | B60K 6/48 |
| 10,300,908 | B2* | 5/2019 | Ishida | B60K 6/48 |
| 2009/0271095 | A1* | 10/2009 | Kojima | F02N 11/0814 |
| | | | | 701/113 |
| 2011/0135498 | A1* | 6/2011 | Gibson | B60W 10/30 |
| | | | | 417/15 |
| 2012/0010792 | A1* | 1/2012 | Nedorezov | B60W 10/11 |
| | | | | 701/54 |
| 2013/0297136 | A1* | 11/2013 | Yamanaka | B60W 10/10 |
| | | | | 903/930 |
| 2014/0221152 | A1 | 8/2014 | Tsutsumi et al. | |
| 2014/0222269 | A1* | 8/2014 | Tsutsumi | B60W 20/40 |
| | | | | 180/65.265 |
| 2022/0065211 | A1* | 3/2022 | Asano | F02N 11/006 |

\* cited by examiner

FIG. 2
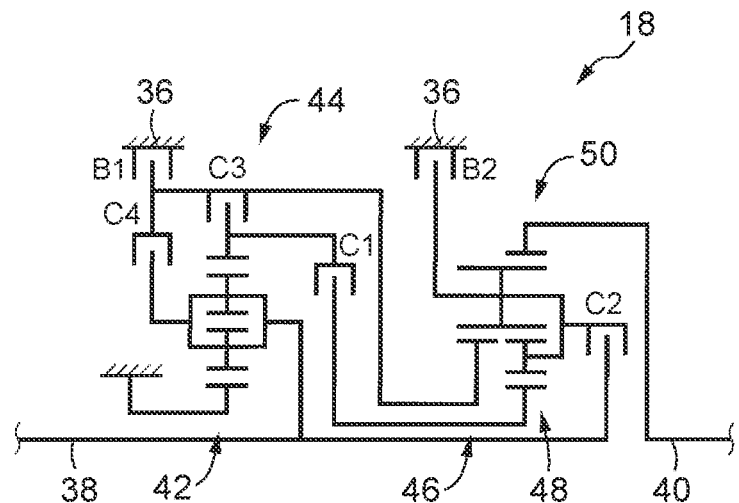
FIG. 3
|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev1 |  |  | ○ |  |  | ○ |
| Rev2 |  |  |  | ○ |  | ○ |
| N |  |  |  |  |  |  |
(○: ENGAGED)
FIG. 4
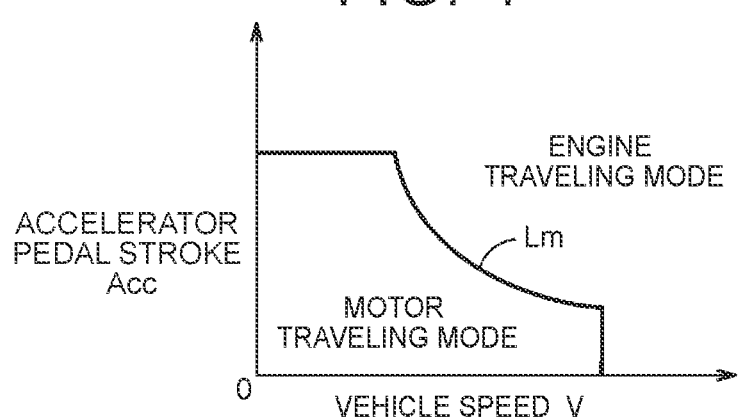

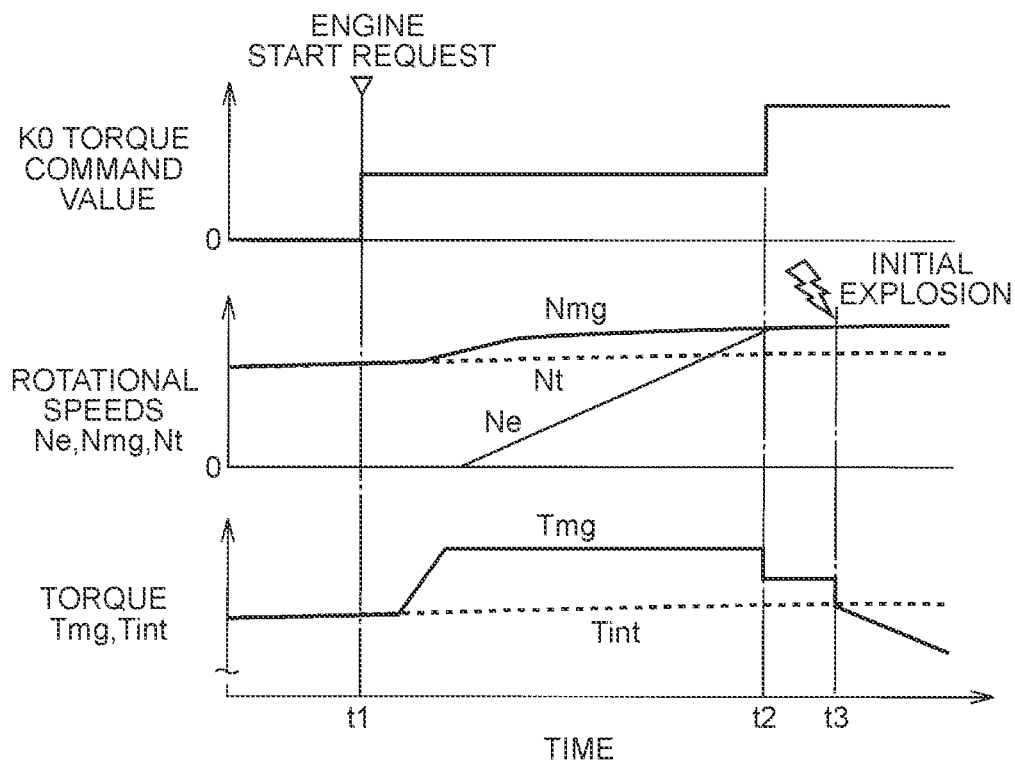
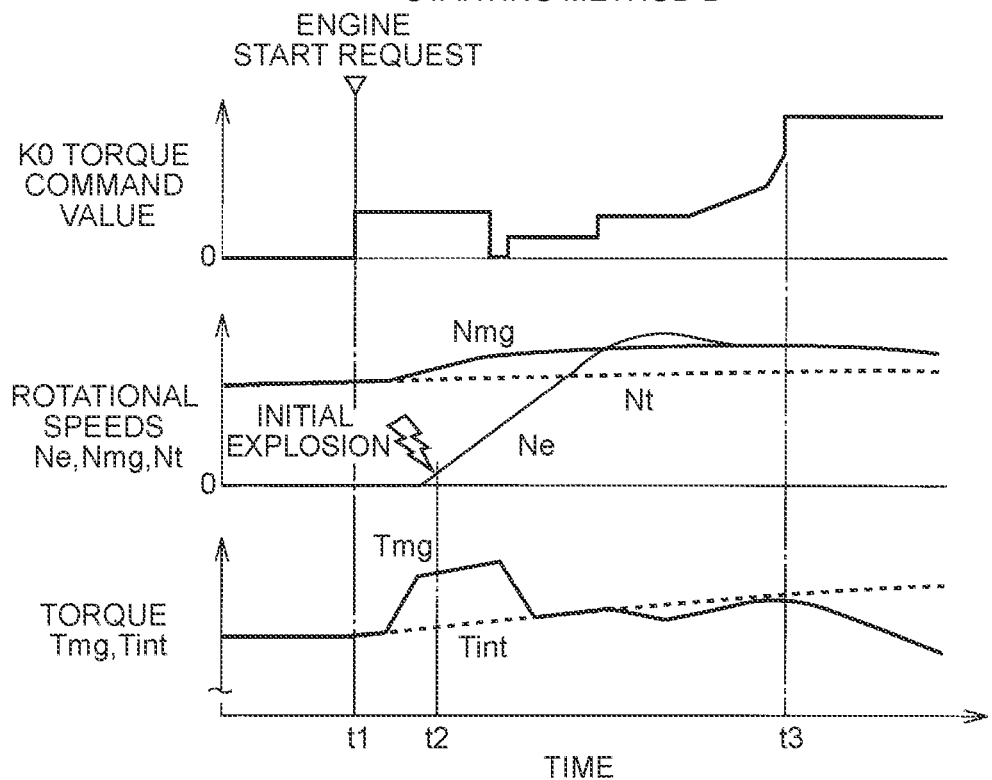

CONTROL DEVICE OF HYBRID VEHICLE

CROSS-REFERENCE TO RELATED APPLICATION

This application claims priority to Japanese Patent Application No. 2020-061531 filed on Mar. 30, 2020, incorporated herein by reference in its entirety.

BACKGROUND

1. Technical Field

The present disclosure relates to a control device of a hybrid vehicle including an engine, engine connecting and disconnecting device, electric motor, and automatic transmission, and in particular to control performed when the engine is started during shift control of the automatic transmission.

2. Description of Related Art

In connection with a hybrid vehicle including an engine, an electric motor to which power is transmitted from the engine via an engine connecting and disconnecting device of a frictional engagement type, and an automatic transmission provided on the downstream side of the motor on a power transmission path, a control device having an engine start controller and a shift controller is known. The engine start controller performs engine start control to start the engine during traveling such that the engine can rotate by itself, and fully engage the engine connecting and disconnecting device. The shift controller switches a gear position of the automatic transmission between a plurality of gear positions, according to predetermined shift conditions. One example of the control device is described in Japanese Unexamined Patent Application Publication No. 2014-151907 (JP 2014-151907 A), in which a clutch K0 is the engine connecting and disconnecting device. According to an engine starting method described in JP 2014-151907 A, the engine performs ignition and rotates by itself after the engine speed is increased through slipping engagement of the engine connecting and disconnecting device. Also, according to a technology described in JP 2014-151907 A, when the engine is started along with a downshift of the automatic transmission, the downshift of the automatic transmission proceeds after the engine speed is increased to start the engine, and the engine connecting and disconnecting device is fully engaged, so that heat and damage generated due to slipping engagement of the engine connecting and disconnecting device are reduced.

SUMMARY

However, when the engine start control is started by the engine start controller during shift control of the automatic transmission by the shift controller, such as when the accelerator pedal is depressed and the engine is started after shift control of a power-OFF downshift with the accelerator pedal released is started, for example, the engine cannot be started and the engine connecting and disconnecting device cannot be fully engaged, before the gearshift, as in JP 2014-151907 A. In this case, if the shift control for a further downshift is executed according to the operation to depress the accelerator pedal, the motor speed is increased, and a speed difference between the motor speed and the engine speed increases; therefore, it takes a long time to raise the engine speed to the synchronous rotation speed corresponding to the motor speed. As a result, a thermal load due to slipping engagement of the engine connecting and disconnecting device may be increased, and the engine connecting and disconnecting device may be damaged due to heat. In particular, when a skip gearshift for shifting down the automatic transmission while skipping one or more gear positions is performed according to the accelerator operation, the amount of increase of the motor speed is increased, and the above problem becomes more significant. To cope with the problem, it may be considered to set shift conditions so that the gear position as a destination of the downshift is restricted to a relatively high gear position, when the engine is started during a downshift of the automatic transmission. However, it takes time to shift down the automatic transmission to a target gear position, and the driveability may deteriorate.

In this connection, an engine starting method for self-rotating the engine through ignition from a stage of low-speed rotation including a stopped state of the engine is known (see, for example, Japanese Unexamined Patent Application Publication No. 2006-348863 (JP 2006-348863 A)). According to the engine starting method, slipping engagement of the engine connecting and disconnecting device is reduced or not required, and therefore, damage due to a thermal load of the engine connecting and disconnecting device can be prevented. However, when the motor speed is relatively low, for example, shock due to the inertia of the engine may be generated when the engine connecting and disconnecting device is fully engaged and the engine is connected to the motor after the start of the engine. Thus, it is not appropriate to employ the engine starting method unconditionally.

The present disclosure provides a control device of a hybrid vehicle, which appropriately determines a gear position to which an automatic transmission is to be shifted down, according to a thermal load of an engine connecting and disconnecting device, when engine start control is started during a downshift of the automatic transmission.

A first aspect of the present disclosure is applied to a hybrid vehicle including an engine, an electric motor configured to receive power from the engine via an engine connecting and disconnecting device of a frictional engagement type, and an automatic transmission provided on a downstream side of the electric motor on a power transmission path of the hybrid vehicle, and is concerned with a control device of the hybrid vehicle including an electronic control unit. The electronic control unit is configured to (a) execute engine start control to control the engine and the engine connecting and disconnecting device so as to start the engine during traveling such that the engine rotates by itself, and fully engage the engine connecting and disconnecting device, (b) control the automatic transmission to switch a gear position of the automatic transmission between a plurality of gear positions, according to predetermined shift conditions, (c) control the engine under the engine start control to start the engine in a selected one of a first starting method in which the engine performs ignition and rotates by itself after an engine speed as a rotational speed of the engine is increased to be equal to or higher than a predetermined rotational speed through slipping engagement of the engine connecting and disconnecting device, and a second starting method in which the engine performs ignition and rotates by itself from a stage before the engine speed reaches the predetermined rotational speed, and (d) control the automatic transmission to permit a lower gear position to be established according to the shift conditions in a case where the engine is started in the second starting method during a downshift of the automatic transmission, as compared with a case where the engine is started in the first starting method during the downshift of the automatic transmission. The downshift of the automatic transmission means a gearshift from a high-speed gear position, i.e., a gear position having a small speed ratio (=input rotational speed/output rotational speed), to a low-speed gear position, i.e., a gear position having a large speed ratio. Also, the lower gear position means a gear position having a larger speed ratio, namely, a lower-speed gear position.

In the control device according to the first aspect of the present disclosure, when the engine is started in the second starting method, the gear position as a destination of downshift, which is determined based on the shift conditions, is permitted to be a lower gear position than that in the case where the engine is started in the first starting method. Namely, in the second starting method in which the engine performs ignition and rotates by itself, from the stage where the engine speed is low, slipping engagement of the engine connecting and disconnecting device is relatively small or not required. Thus, even when the gear position as the destination of downshift is a relatively low gear position, and the amount of increase of the motor speed caused by the downshift is large, resulting in a large speed difference between the motor speed and the engine speed, the engine connecting and disconnecting device is unlikely to be damaged due to a thermal load caused by slipping engagement. Thus, the gear position determined based on the shift conditions is allowed to be a low gear position, and the automatic transmission can be promptly shifted down to a target gear position. Also, since the motor speed becomes relatively high, due to the downshift to a relatively low gear position, shock generated due to the inertia of the engine is curbed when the engine connecting and disconnecting device is fully engaged after the start of the engine, and the engine is connected to the motor.

In the control device according to the first aspect of the present disclosure, the electronic control unit may be configured to control the engine to complete the engine start control by executing the first starting method when a motor speed as a rotational speed of the electric motor is lower than a predetermined first determination value at a start of the engine start control, and complete the engine start control by executing the second starting method when the motor speed is equal to or higher than the first determination value at the start of the engine start control.

The control device as described above completes the engine start control by executing the second starting method when the motor speed is equal to or higher than the first determination value at the start of the engine start control. Thus, the engine start control is performed in the second starting method in a condition where the motor speed is relatively high, while the gear position determined based on the shift conditions is allowed to be a low gear position in the second starting method, and the gear position as a destination of downshift is set to the low gear position. As a result, the motor speed is further increased, and shock generated due to the inertia of the engine when the engine connecting and disconnecting device is fully engaged and the engine is connected to the motor is appropriately reduced or curbed. On the other hand, when the motor speed at the start of the engine start control is lower than the first determination value, the engine start control is completed by executing the first starting method. Thus, the gear position as a destination of downshift is set to a relatively high gear position according to the shift conditions, and the engine start control is performed by the first starting method in a condition where the motor speed is relatively low. As a result, damage due to the thermal load of the engine connecting and disconnecting device is reduced.

In the control device according to the first aspect of the present disclosure, the electronic control unit may be configured to control the engine to switch to the second starting method when a motor speed as a rotational speed of the electric motor becomes equal to or higher than a predetermined second determination value, before the engine start control is completed through execution of the first starting method. Also, the electronic control unit may be configured to control the automatic transmission such that, when a starting method of the engine is switched from the first starting method to the second starting method during shift control of the automatic transmission, the shift conditions permit a lower gear position than that based on the shift conditions in the first starting method to be established, in response to switching of the starting method.

When the motor speed becomes equal to or higher than the predetermined second determination value before the engine start control is completed, during starting of the engine in the first starting method, namely, when the motor speed is increased to be higher than the second determination value, in the process of increasing the engine speed through slipping engagement of the engine connecting and disconnecting device, the engine starting method is switched to the second starting method. As a result, damage due to a thermal load of the engine connecting and disconnecting device is appropriately reduced or curbed, irrespective of increase of the motor speed during the engine start control. Also, when the engine starting method is switched from the first starting method to the second starting method, a low gear position is determined based on the shift conditions, upon switching of the starting method; therefore, the automatic transmission can be promptly shifted down to a target gear position, and shock, which would be generated due to the inertia of the engine when the engine connecting and disconnecting device is fully engaged, can be appropriately reduced since the motor speed becomes high.

A second aspect of the present disclosure is applied to a hybrid vehicle including an engine, an electric motor configured to receive power from the engine via an engine connecting and disconnecting device of a frictional engagement type, and an automatic transmission provided on a downstream side of the electric motor on a power transmission path of the hybrid vehicle, and is concerned with a control device of the hybrid vehicle including an electronic control unit. The electronic control unit is configured to: (a) execute engine start control to control the engine and the engine connecting and disconnecting device so as to start the engine during traveling such that the engine rotates by itself, and fully engage the engine connecting and disconnecting device, (b) control the automatic transmission to switch a gear position of the automatic transmission between a plurality of gear positions, according to predetermined shift conditions, by switching engaged and released states of a plurality of frictional engagement devices of the automatic transmission, and (c) control the automatic transmission when the engine start control is started during a downshift of the automatic transmission, to permit a lower gear position to be established according to the shift conditions in a case where an inertia phase in which an input rotational speed of the automatic transmission is increased has not started, and the automatic transmission is able to stand by in a state before start of the inertia phase, as compared with a case where the downshift is in the inertia phase or a case where the inertia phase has not started, and the automatic transmission is unable to stand by in the state before start of the inertia phase.

In the control device according to the second aspect of the present disclosure, when the engine start control is started during a downshift of the automatic transmission, and the inertia phase has not started and the automatic transmission can stand by in a state before start of the inertia phase, the gear position as a destination of the downshift based on the shift conditions is allowed to be a lower gear position than that in the case where the downshift is in the inertia phase, or the case where the inertia phase has not started and the automatic transmission cannot stand by in the state before start of the inertia phase. Namely, when the inertia phase has not started, and the automatic transmission can stand by in the state before start of the inertia phase, the motor speed is kept relatively low if the transmission stands by in the state before start of the inertia phase. Thus, even when the engine is started in the first starting method, a thermal load due to slipping engagement of the engine connecting and disconnecting device is small, and damage of the engine connecting and disconnecting device is reduced. Also, the engine connecting and disconnecting device is fully engaged after the engine start control is completed, and the gear position as a destination of the downshift need not be restricted; therefore, the gear position determined based on the shift conditions is allowed to be the lower gear position, and the automatic transmission can be promptly shifted down to a target gear position.

In the control device according to the second aspect of the present disclosure, the electronic control unit may be configured to perform shift control of the downshift, by reducing an engaging pressure of a release-side frictional engagement device as one of the frictional engagement devices, and permitting increase of the input rotational speed, and the electronic control unit may be configured to enable the automatic transmission to stand by in the state before start of the inertia phase, by generating a command to stop reduction of the engaging pressure.

In the case where a downshift proceeds by reducing the engaging pressure of the release-side frictional engagement device as one of the frictional engagement devices, and permitting increase of the input rotational speed, a command to interrupt reduction of the engaging pressure is generated, to keep the automatic transmission in the state before start of the inertia phase. Thus, the motor speed is kept at a relatively low speed, and the engine can be appropriately started even when it is started in the first starting method, while a thermal load of the engine connecting and disconnecting device is reduced.

A third aspect of the present disclosure is applied to a hybrid vehicle including an engine, an electric motor configured to receive power from the engine via an engine connecting and disconnecting device of a friction engagement type, and an automatic transmission provided on a downstream side of the electric motor on a power transmission path of the hybrid vehicle, and is concerned with a control device of the hybrid vehicle including an electronic control unit. The electronic control unit is configured to (a) execute engine start control to control the engine and the engine connecting and disconnecting device so as to start the engine during traveling such that the engine rotates by itself, and fully engage the engine connecting and disconnecting device, (b) control the automatic transmission to switch a gear position of the automatic transmission between a plurality of gear positions, according to predetermined shift conditions, by switching engaged and released states of a plurality of frictional engagement devices of the automatic transmission, and (c) control the automatic transmission when the engine start control is started during a downshift of the automatic transmission, to permit a lower gear position to be established according to the shift conditions in a case where an inertia phase in which an input rotational speed of the automatic transmission is increased has not started, and the engine connecting and disconnecting device has been synchronized, as compared with a case where the inertia phase has not started, and the engine connecting and disconnecting device has not been synchronized. The synchronization of the engine connecting and disconnecting device means a relationship between the engine-side rotational speed and the motor-side rotational speed, which provides a condition where the engine connecting and disconnecting device can be fully engaged. Where the engine connecting and disconnecting device is a clutch, the relationship is that the engine-side rotational speed is equal to the motor-side rotational speed.

In the control device according to the third aspect of the present disclosure, when the engine start control is started during a downshift of the automatic transmission, the gear position as a destination of the downshift based on the shift conditions is allowed to be a lower gear position in the case where the inertia phase has not started and the engine connecting and disconnecting device has been synchronized, as compared with the case where the inertia phase has not started and the engine connecting and disconnecting device has not been synchronized. Namely, before the inertia phase starts and after the engine connecting and disconnecting device is synchronized, there is no fear of damage due to a thermal load caused by slipping engagement of the engine connecting and disconnecting device, and the gear position as a destination of downshift need not be restricted; therefore, the gear position determined based on the shift conditions is allowed to be the lower gear position, and the automatic transmission can be promptly shifted down to a target gear position.

In the control device according to the second or third aspect of the present disclosure, the electronic control unit may be configured to control the engine and the engine connecting and disconnecting device to start the engine in a first starting method in which the engine performs ignition and rotates by itself after an engine speed as a rotational speed of the engine is increased to be equal to or higher than a predetermined rotational speed through slipping engagement of the engine connecting and disconnecting device.

When the engine can be started in the first starting method in which the engine performs ignition and rotates by itself after the engine speed is increased to be equal to or higher than the predetermined rotational speed through slipping engagement of the engine connecting and disconnecting device, the thermal load of the engine connecting and disconnecting device is increased if the motor speed is increased due to a downshift; therefore, the shift conditions are set so that the gear position as a destination of the downshift is restricted to a high gear position when the engine is started. Accordingly, the electronic control unit permits the gear position determined based on the shift conditions to be a relatively low gear position, under a given condition, at the start of the engine, so as to promptly shift down the automatic transmission to a target gear position, while reducing damage due to the thermal load of the engine connecting and disconnecting device. Thus, the effects of the second and third aspects of the present disclosure can be appropriately obtained.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 is a skeleton diagram illustrating one example of an automatic transmission included in the hybrid vehicle of FIG. 1;

FIG. 3 is an engagement operation table useful for describing the relationship between a plurality of gear positions of the automatic transmission of FIG. 2 and engaged and released states of hydraulic frictional engagement devices;

FIG. 4 is a view showing one example of a traveling mode switching map for use in switching, according to operating conditions, between a motor traveling mode in which the vehicle travels, exclusively using an electric motor as a drive source in the hybrid vehicle of FIG. 1, and an engine traveling mode in which the vehicle travels, using at least the engine as the drive source;

FIG. 7 is one example of a time chart useful for describing a starting method A that can be selected in step SS2 of FIG. 6;

FIG. 8 is one example of a time chart useful for describing a starting method B that can be selected in step SS2 of FIG. 6;

DETAILED DESCRIPTION OF EMBODIMENTS

Figure 1:
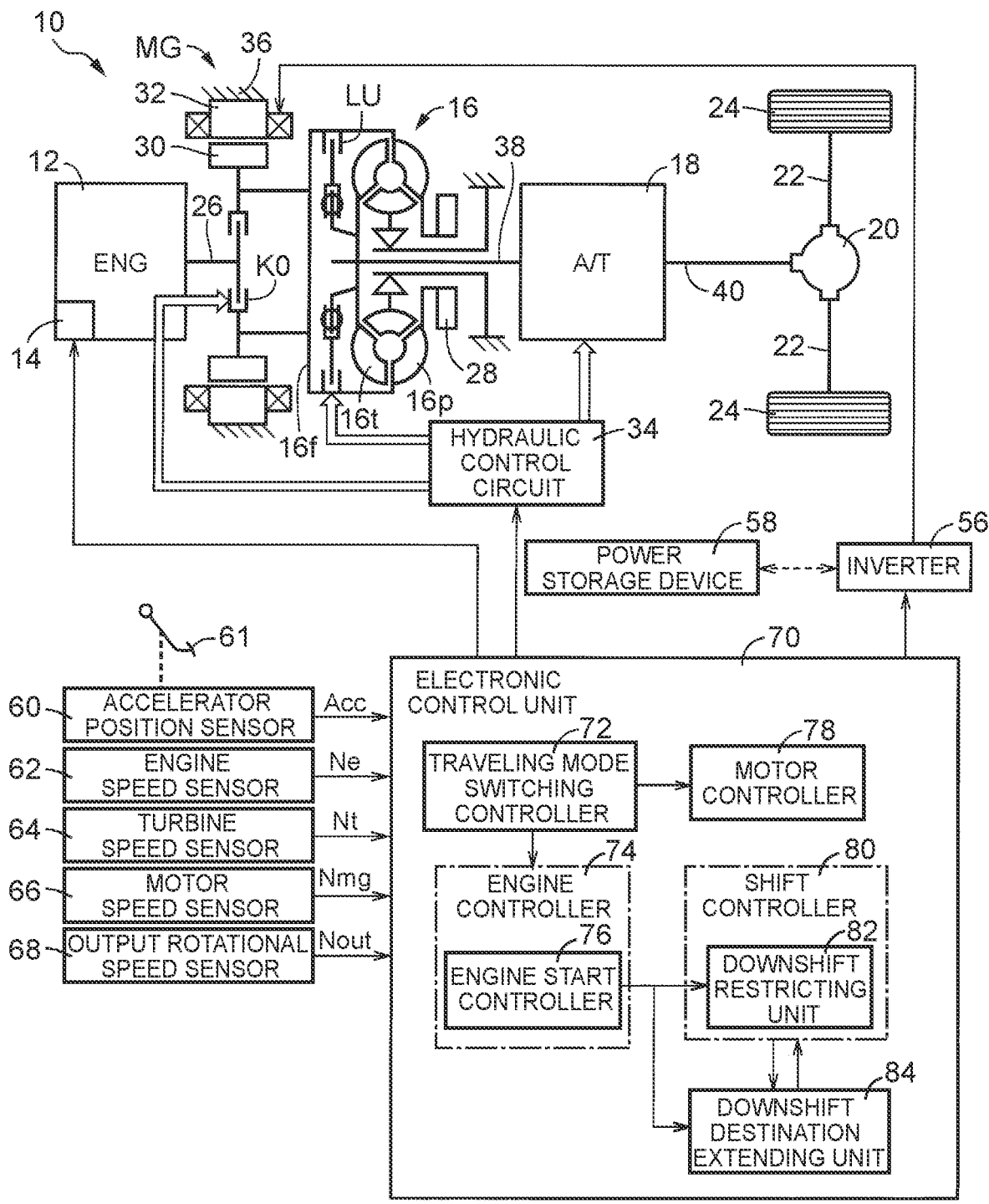
FIG. 1 is a schematic construction diagram of a drive system of a hybrid vehicle to which the present disclosure is applied, along with a principal part of control functions.

The engine of the hybrid vehicle to which the present disclosure is applied is an internal combustion engine that generates power through combustion of fuel. In particular, the engine capable of starting in the second starting method in which the engine performs ignition and rotates by itself from a low-speed-rotation stage where the engine speed is low is a direct-injection type internal combustion engine in which the fuel is directly injected into cylinders. In the second starting method, the fuel is injected and ignited at around the compression top dead center (TDC), to start the engine, and the engine can rotate by itself upon ignition and explosion in the stage where the engine speed is low. Depending on a control method, it is possible to self-rotate the engine by igniting the fuel in a condition where the engine speed is equal to zero. The engine may be started in the second starting method while the engine is rotated with the engine connecting and disconnecting device slipping; however, the engine may also be started in the second starting method while the engine connecting and disconnecting device is kept released. When the engine is started only in the first starting method in which the engine performs ignition and rotates by itself after the engine speed is increased to be equal to or higher than a predetermined rotational speed, through slipping engagement of the engine connecting and disconnecting device, the engine is not necessarily required to be the direct-injection type internal combustion engine. The predetermined rotational speed is, for example, an idling speed at which the engine can keep rotating under engine control through normal fuel injection, ignition, etc.

While a motor-generator that can also be used as a generator is appropriately used as the electric motor, the motor may also be an electric motor that cannot be used as a generator. The engine connecting and disconnecting device, which connects and disconnects a power transmission path between the engine and the motor, is a clutch or brake of a frictional engagement type. A frictional engagement type clutch that connects and disconnects upstream and downstream rotating elements to and from each other is appropriately used as the engine connecting and disconnecting device. However, where a planetary gear drive having three rotating elements is disposed between the engine and the motor, for example, and two of the rotating elements are connected to the engine and the motor, respectively, a brake of a frictional engagement type which fixes the remaining one rotating element non-rotatably may be used as the engine connecting and disconnecting device. While the engine and the motor may be directly connected to each other via the engine connecting and disconnecting device, a speed change mechanism, such as a speed change gear, may be provided between the engine and the engine connecting and disconnecting device, or between the engine connecting and disconnecting device and the motor.

An automatic transmission of a planetary gear type having two or more gear positions is appropriately used as the automatic transmission. This type of automatic transmission can establish two or more gear positions having different speed ratios, through switching of engaged and released states of two or more frictional engagement devices, for example. However, the first aspect of the present disclosure may also be applied to the case where the speed ratio of a continuously variable transmission of a belt type, for example, is changed stepwise as in the transmission having two or more gear positions. Also, this present disclosure is favorably applied, when the required driving force is increased, and engine speed control is started by the engine start controller, during shift control for shifting down the automatic transmission when a downshift determination is made during deceleration of the hybrid vehicle, and the shift controller makes a skip gearshift determination to shift down the automatic transmission while skipping one or more gear positions. While the required driving force is increased when the driver performs accelerating operation, for example, when the driver depresses the accelerator pedal, the required driving force may be increased during autonomous driving where the driver does not perform accelerating operation. The vehicle may be decelerated in a power-OFF state (driven state), or in a power-ON state (driving state). The required driving force may be increased when the accelerator pedal is depressed from an accelerator-OFF state where the accelerator pedal stroke is equal to zero, or when the accelerator pedal is further depressed from a state where the accelerator pedal is depressed.

The shift conditions of the automatic transmission are used for determining a destination gear position as a gear position to which the automatic transmission is shifted, using operating conditions, such as the accelerator pedal stroke and the vehicle speed, as parameters. For example, a target gear position is set according to operating conditions, and the target gear position is determined as the destination gear position, when the actual gear position and the target gear position are different from each other. The shift conditions are also set to restrict the destination gear position under a given condition, such as start of the engine. For example, when required driving force is increased, and the engine start control is started by the engine start controller, during shift control for shifting down the automatic transmission, in response to a downshift determination made by the shift controller, and a skip gearshift determination for a downshift skipping one or more gear positions is made by the shift controller, the gear position as a destination of the downshift is restricted to a higher gear position, so as to prevent the engine connecting and disconnecting device from being damaged by a thermal load, at the start of the engine in the first starting method.

When the engine starting method is switched from the first starting method to the second starting method during shift control of the automatic transmission, the gear position set based on the shift conditions is permitted to be a lower gear position than that set based on the shift conditions in the first starting method. However, in implementation of the first aspect of the present disclosure, the shift conditions may be maintained irrespective of change of the starting method. The gear position may be permitted to be the lower gear position than that set based on the shift conditions in the first starting method, when the automatic transmission is shifted down to a target gear position, or when it is shifted town to an intermediate gear position between the gear position before shifting, and the target gear position.

In the second and third aspects of the present disclosure, the engine may be started only in the first starting method in which the engine performs ignition and rotates by itself after the engine speed is increased to be equal to or higher than the predetermined rotational speed through slipping engagement of the engine connecting and disconnecting device, for example. However, as in the first aspect of the present disclosure, the engine may be started in a selected one of the first starting method and the second starting method.

Embodiment

One embodiment of the present disclosure will be described in detail with reference to the drawings. In the following embodiment, components or parts depicted in the drawings are simplified or modified as needed for illustrative purposes, and the ratio of dimensions, shape, etc. of each component or part are not necessarily accurate.

FIG. 1 is a schematic configuration diagram showing a drive system of a hybrid vehicle 10 to which the present disclosure is applied, along with a principal part of control functions. The hybrid vehicle 10 includes an engine (ENG) 12 and an electric motor MG (which will be simply called "motor MG") that function as drive sources, and is constructed such that power generated by the engine 12 and motor MG is transmitted to a pair of right and left drive wheels 24, via a power transmission system having a torque converter 16, automatic transmission (A/T) 18, differential gear unit 20, and a pair of right and left drive shafts 22. The motor MG, torque converter 16, and automatic transmission 18 are all housed in a transmission case 36 (which will be simply called "case 36"). The case 36 consists of two or more case members, and is fixed to a non-rotating member, such as a vehicle body. The hybrid vehicle 10 travels, using at least one of the engine 12 and the motor MG as a drive source(s) for traveling. Namely, the hybrid vehicle 10 is operable in a selected one of an engine traveling mode in which at least the engine 12 is used as the drive source for traveling, and a motor traveling mode in which the motor MG is exclusively used as the drive source for traveling. In the engine traveling mode, the motor MG is used as needed, as an auxiliary drive source.

The engine 12 is an internal combustion engine, such as a gasoline engine of a direct injection type in which fuel is directly injected into combustion chambers, or a diesel engine. An output control device 14, which is provided for controlling torque of the engine 12, includes a throttle actuator that controls opening/closing of an electronic throttle valve, fuel injection device that performs fuel injection control, ignition device that performs ignition timing control, and so forth. The output control device 14 performs output control of the engine 12, by controlling opening/closing of the electronic throttle valve by use of the throttle actuator for throttle control, according to a command supplied from an electronic control unit 70, controlling fuel injection by the fuel injection device for fuel injection control, and controlling the ignition timing of the ignition device for ignition timing control, for example.

A lock-up clutch LU is provided between a pump impeller 16p and a turbine wheel 16t of the torque converter 16, for directly coupling the pump impeller 16p and the turbine wheel 16t so that they rotate as a unit. The lock-up clutch LU is controlled to an engagement state selected from an engaged (fully engaged) state, slipping state, and a released (fully released) state, according to a hydraulic pressure supplied from a hydraulic control circuit 34. A mechanical oil pump 28 is connected to the pump impeller 16p of the torque converter 16, and a hydraulic pressure generated by the oil pump 28 according to rotation of the pump impeller 16p is supplied as an original pressure to the hydraulic control circuit 34.

FIG. 2 is a skeleton diagram showing one example of the automatic transmission 18. The automatic transmission 18 is constructed generally symmetrically with respect to its axis; thus, the lower half of the automatic transmission 18 is not illustrated in the skeleton diagram of FIG. 2. As shown in FIG. 2, the automatic transmission 18 is disposed between an input shaft 38 connected to the turbine wheel 16t of the torque converter 16, and an output shaft 40 connected to the differential gear unit 20. The automatic transmission 18 includes a first speed change unit 44 that principally consists of a double-pinion type first planetary gear drive 42, and a second speed change unit 50 that principally consists of a single-pinion type second planetary gear drive 46 and a double-pinion type third planetary gear drive 48. The first and second speed change units 44, 50 are arranged on a common axis. The automatic transmission 18 changes the speed of rotation of the input shaft 38, and delivers resultant rotative power from the output shaft 40. The second planetary gear drive 46 and third planetary gear drive 48 provide a Ravigneaux-type planetary gear train in which carriers and ring gears of these gear drives 46, 48 are provided by respective common members, and pinion gears of the second planetary gear drive 46 also serve as second pinion gears (outer pinion gears) of the third planetary gear drive 48.

The automatic transmission 18 includes four clutches C1 to C4, and two brakes B1, B2 (which will be simply referred to as "engagement devices CB" when they are not particularly distinguished from each other), as hydraulic frictional engagement devices. As indicated in the engagement operation table of FIG. 3, forward eight speeds from a first-speed gear position "1st" to an eight-speed gear position "8th", and reverse two speeds of a first-speed reverse gear position "Rev1" and a second-speed reverse gear position "Rev2", are established by engaging selected two of the engagement devices CB, and "N" (neutral) where power transmission is cut off is established by releasing all of the engagement devices CB. The first-speed gear position "1st" is a low-speed gear position having the largest speed ratio γ (=the rotational speed of the input shaft 38/the rotational speed of the output shaft 40), and the eighth-speed gear position "8th" is a high-speed gear position having the smallest speed ratio γ. Namely, the first-speed gear position "1st" side is the low gear position side, and the eighth-speed gear position "8th" side is the high gear position side. As is apparent from FIG. 3, when the automatic transmission 18 of this embodiment is shifted between two consecutive forward gear positions, such as between the second-speed gear position "2nd" and the third-speed gear position "3rd", a clutch-to-clutch gearshift is performed, namely, one of the engagement devices CB is released, and another engagement device CB is engaged. The engagement device CB is in the form of, for example, a wet multiple-disk clutch in which a plurality of friction plates stacked together are pressed by a hydraulic actuator, or a band brake in which one end of one or two bands wound on an outer circumferential surface of a rotating drum is pulled and tightened by a hydraulic actuator, or the like, and serves to selectively connect two members between which the engagement device CB is inserted.

Referring back to FIG. 1, the motor MG includes a rotor 30 that is supported by the case 36 such that it can rotate about its axis, and a stator 32 that is fixed integrally to the case 36 on the radially outer side of the rotor 30. The motor MG is a motor-generator that functions as an electric motor that generates rotative power, and also functions as a generator that generates electric power under regenerative control, to generate reactive force. The motor MG is connected to a power storage device 58, such as a battery or a capacitor, via an inverter 56, and drive current supplied to the motor MG via the inverter 56 is adjusted by the electronic control unit 70, so that driving of the motor MG is controlled. In other words, output torque of the motor MG is increased or reduced through control via the inverter 56.

On a power transmission path between the engine 12 and the motor MG, a clutch K0 is provided for controlling power transmission on the power transmission path, according to its engagement state. Namely, a crankshaft 26 as an output member of the engine 12 is selectively connected to the rotor 30 of the motor MG via the clutch K0. The rotor 30 of the motor MG is connected to a front cover 16f as an input member of the torque converter 16. The pump impeller 16p is integrally connected to the front cover 16f For example, the clutch K0 is a multiple-disk, hydraulic frictional engagement device of which engagement is controlled by a hydraulic actuator, and its engagement state is controlled to one of an engaged (fully engaged) state, slipping state, and released (fully released) state, according to a hydraulic pressure supplied from the hydraulic control circuit 34. Namely, the torque capacity of the clutch K0 is controlled according to the hydraulic pressure supplied from the hydraulic control circuit 34. When the clutch K0 is engaged, power is transmitted via the power transmission path between the crankshaft 26, and the rotor 30 and front cover 16f (namely, the crankshaft 26 is connected to the rotor 30 and front cover 16f. On the other hand, when the clutch K0 is released, power transmission via the power transmission path between the crankshaft 26, and the rotor 30 and front cover 16f, is cut off. When the clutch K0 is in the slipping state, power is transmitted according to the torque capacity (transmission torque) of the clutch K0, via the power transmission path between the crankshaft 26, and the rotor 30 and front cover 16f The clutch K0 is the engine connecting and disconnecting device that connects or disconnects the power transmission path between the engine 12 and the motor MG.

The hybrid vehicle 10 includes a control system as illustrated in FIG. 1 by way of example. The electronic control unit 70 shown in FIG. 1 includes a so-called microcomputer including a central processing unit (CPU), random access memory (RAM), read-only memory (ROM), input-output interface, and so forth. The CPU performs signal processing according to programs stored in advance in the ROM, while utilizing the temporary storage function of the RAM, so as to perform various controls, such as drive control of the engine 12, drive control of the motor MG, shift control of the automatic transmission 18, engagement force control of the clutch K0, and engagement control of the lock-up clutch LU. The electronic control unit 70 may be divided into two or more control units, such as a unit for control of the engine 12, a unit for control of the motor MG, and a unit for control of the automatic transmission 18, as needed, and may perform various controls by communicating information between the units. In this embodiment, the electronic control unit 70 corresponds to the control device of the hybrid vehicle 10.

The electronic control unit 70 is supplied with various input signals detected by respective sensors provided in the hybrid vehicle 10. For example, the electronic control unit 70 is supplied with a signal representing the accelerator pedal stroke Acc that is detected by an accelerator position sensor 60 and corresponds to the amount of depression (accelerator operation amount) of an accelerator pedal 61 as an accelerating member, a signal representing the rotational speed (engine speed) Ne of the engine 12 detected by an engine speed sensor 62, a signal representing the rotational speed (turbine speed) Nt of the turbine wheel 16t of the torque converter 16 detected by a turbine speed sensor 64, a signal representing the rotational speed (motor speed) Nmg of the motor MG detected by a motor speed sensor 66, a signal representing the rotational speed (output rotational speed) Nout of the output shaft 40 detected by an output rotational speed sensor 68, and so forth. The turbine speed Nt is the same as the input rotational speed Nin as the rotational speed of the input shaft 38, and the output rotational speed Nout corresponds to the vehicle speed V.

Also, various control signals are supplied from the electronic control unit 70, to respective devices provided in the hybrid vehicle 10. For example, a signal that controls the output control device 14 of the engine 12 for drive control of the engine 12, a signal that controls the inverter 56 for drive control of the motor MG, a signal that controls a plurality of electromagnetic control valves in the hydraulic control circuit 34 for shift control of the automatic transmission 18, a signal that controls a linear solenoid valve, etc. in the hydraulic control circuit 34 for engagement control of the clutch K0, a signal that controls a linear solenoid valve, etc. in the hydraulic control circuit 34 for engagement control of the lock-up clutch LU, a signal that controls a linear solenoid valve, etc. in the hydraulic control circuit 34 for line pressure control, etc., are supplied from the electronic control unit 70.

The electronic control unit 70 functionally includes a traveling mode switching controller 72, engine controller 74, motor controller 78, shift controller 80, and downshift destination extending unit 84.

The traveling mode switching controller 72 determines whether the hybrid vehicle 10 will travel in the motor traveling mode in which the motor MG is exclusively used as the drive source, or in the engine traveling mode in which at least the engine 12 is used as the drive source, and switches the traveling mode of the hybrid vehicle 10 to the selected traveling mode. More specifically, according to a traveling mode switching map shown in FIG. 4 by way of example, the traveling mode switching controller 72 sets the traveling mode to the motor traveling mode when the vehicle speed V is lower than and the accelerator pedal stroke Acc is smaller than those of a mode switching line Lm, and sets the traveling mode to the engine traveling mode when the vehicle speed V is higher than and the accelerator pedal stroke Acc is larger than those of the mode switching line Lm. In the traveling mode switching map of FIG. 4, the accelerator pedal stroke Acc and the vehicle speed V as operating conditions are used as parameters, and the motor traveling mode or the engine traveling mode is determined, according to the actual accelerator pedal stroke Acc and vehicle speed V. In the engine traveling mode, the motor MG is driven and used as an auxiliary drive source as needed. The accelerator pedal stroke Acc in the traveling mode switching map of FIG. 4 may be replaced with the required driving force, for example.

When the traveling mode switching controller 72 sets the traveling mode to the engine traveling mode, the engine controller 74 actuates the engine 12 in a condition where the clutch K0 is fully engaged, and runs the hybrid vehicle 10, using at least the engine 12 as the drive source. The engine controller 74 calculates the required driving force based on the accelerator pedal stroke Acc, for example, and controls the output of the engine 12 so as to obtain the required driving force. For example, the engine controller 74 calculates a target input torque Tint of the input shaft 38 for obtaining the required driving force, based on the gear position, etc. of the automatic transmission 18, and controls the output of the engine 12 so as to obtain the target input torque Tint.

Figure 6:
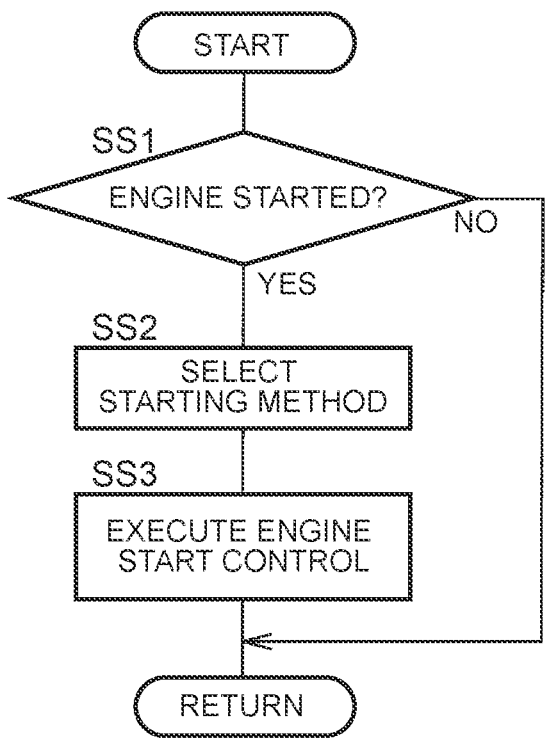
FIG. 6 is a flowchart illustrating operation of an engine start controller functionally included in the electronic control unit of FIG. 1.

The engine controller 74 also functionally includes an engine start controller 76 for starting the engine 12 in a condition where its rotation is stopped during traveling, in the case where the traveling mode is switched from the motor traveling mode to the engine traveling mode, for example. The engine start controller 76 performs signal processing according to step SS1 to step SS3 in the flowchart of FIG. 6. In step SS1 of FIG. 6, the engine start controller 76 determines whether the engine 12 is to be started in response to an engine start request, or the like, from the traveling mode switching controller 72, and executes step SS2 and step SS3 when the engine 12 is to be started. In step SS2, the engine start controller 76 selects one of two starting methods, i.e., a starting method A and a starting method B. In step SS3, the engine start controller 76 executes engine start control for starting the engine 12 such that it can rotate by itself, and fully engaging the clutch K0.

In the starting method A, the engine speed Ne is increased to be equal to or higher than the idling speed Nidle through slipping engagement of the clutch K0, and then, an air-fuel mixture is ignited so that the engine 12 rotates by itself. FIG. 7 is one example of a time chart showing changes in a K0 torque command value, rotational speeds Ne, Nmg, Nt, and torques Tmg, Tint when the engine 12 is started according to the starting method A. Torque Tmg is torque (motor torque) of the motor MG, and torque Tint is target input torque of the input shaft 38 for obtaining the required driving force. In FIG. 7, at time t1 at which an engine start request is made, the motor speed Nmg is higher than the idling speed Nidle, and the engine start control is started according to the starting method A. More specifically, the engine speed Ne is increased through slipping engagement of the clutch K0, and the motor torque Tmg is increased to be larger than the target input torque Tint so as to increase the engine speed. At time t2, the engine speed Ne has been increased to around the K0 synchronous rotation speed equal to the motor speed Nmg. At this time, the clutch K0 is fully engaged when the engine speed Ne reaches around the K0 synchronous rotation speed, and the motor torque Tmg is reduced. At time t3 after the clutch K0 is fully engaged, fuel injection and ignition are carried out, so that the engine 12 rotates by itself. In this manner, a sequence of engine start control is completed. As the engine 12 rotates by itself, the target input torque Tint is provided by the engine 12, and the motor torque Tmg is gradually reduced, for transition to the engine traveling mode. The starting method A corresponds to the first starting method, and the idling speed Nidle corresponds to the predetermined rotational speed. In this connection, after the engine speed Ne is increased to be equal to or higher than the idling speed Nidle, the fuel injection and ignition may be carried out before the clutch K0 is fully engaged, so that the engine 12 can rotate by itself.

In the starting method B, the engine 12 performs ignition and rotates by itself, from a stage where the engine speed Ne is lower than the idling speed Nidle, namely, the fuel is injected and ignited at a given time around the compression top dead center (TDC), so as to start the engine 12. In this method, the mixture is ignited while the engine speed Ne is low, and its explosion causes the engine 12 to rotate by itself. In the starting method B, the engine 12 may be started while being rotated with the clutch K0 being in the slipping state, but the engine 12 may also be started while the clutch K0 is kept released. FIG. 8 is one example of a time chart showing changes in the K0 torque command value, rotational speeds Ne, Nmg, Nt, and torques Tmg, Tint when the engine 12 is started according to the starting method B. In FIG. 8, at time t1 at which an engine start request is made, the engine start control according to the starting method B is started. More specifically, while the engine 12 is rotated with the clutch K0 being in the slipping state, the fuel is injected and ignited at a given time around the compression TDC, so that the engine 12 rotates by itself (time t2). The engine speed Ne at this time t2 is sufficiently lower than the idling speed Nidle. Once the engine 12 becomes able to rotate by itself, the engine speed Ne increases on its own, and the clutch K0 is released. Then, when the engine speed Ne is increased to around the K0 synchronous rotation speed equal to the motor speed Nmg, the clutch K0 is fully engaged (time t3), and a sequence of engine start control is completed. The motor speed Nmg, or the engine speed Ne, at time t3 is higher than the idling speed Nidle. Since the engine 12 rotates by itself, and the clutch K0 is fully engaged, the target input torque Tint is provided by the engine 12, and the motor torque Tmg is gradually reduced, for transition to the engine traveling mode. The starting method B corresponds to the second starting method.

Figure 9:
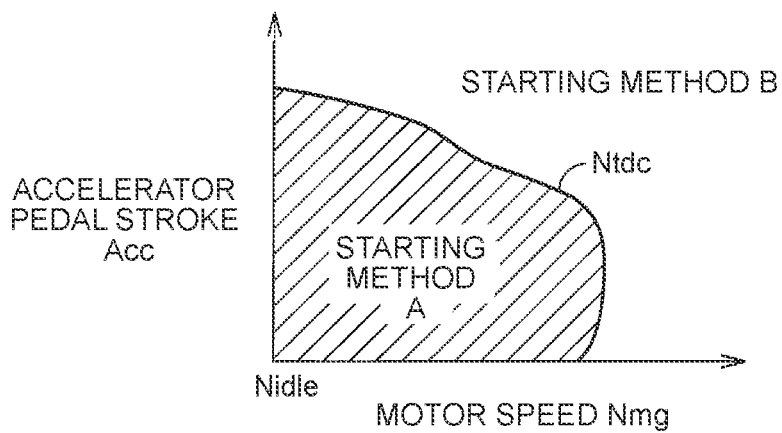
FIG. 9 is a view showing one example of a starting method selection map used when selecting one of the starting method A and the starting method B in step SS2 of FIG. 6, according to operating conditions.

In the starting method B, the clutch K0 is released in the stage where the engine 12 can rotate by itself; therefore, a thermal load of the clutch K0 is smaller than that in the starting method A. Also, since the engine speed Ne increases through self-rotation of the engine 12, the response is excellent until the engine speed Ne reaches around the K0 synchronous rotation speed equal to the motor speed Nmg; however, if the motor speed Nmg is low, shock (variation in the driving force) may arise due to the inertia of the engine 12, when the clutch K0 is fully engaged, and the engine 12 is connected to the motor MG. In step SS2 of FIG. 6, one of the starting methods is selected according to a predetermined starting method selection condition, based on differences in characteristics between the starting method A and the starting method B. The starting method selection condition is defined according to operating conditions, such as the accelerator pedal stroke Acc and the motor speed Nmg, for example. The starting method selection map of FIG. 9 is one example of the starting method selection condition, and the method B lower-limit rotational speed Ntdc is defined, using the accelerator pedal stroke Acc as a parameter. According to this map, the starting method B is selected when the motor speed Nmg at the start of the engine start control (time t1 in FIG. 7, FIG. 8) is equal to or higher than the method B lower-limit rotational speed Ntdc, and the starting method A is selected when the motor speed Nmg is lower than the method B lower-limit rotational speed Ntdc, namely, when it is in a hatched region of FIG. 9. The starting method selection map of FIG. 9 is set for each of the gear positions of the automatic transmission 18. Also, the starting method selection map is set according to the engagement state (fully engaged, slipping, or released) of the lock-up clutch LU. The method B lower-limit rotational speed Ntdc corresponds to the first determination value. The accelerator pedal stroke Acc in the starting method selection map of FIG. 9 may be replaced with the required driving force, for example, and the motor speed Nmg may be replaced with the vehicle speed V, for example.

Referring back to FIG. 1, when the traveling mode switching controller 72 sets the traveling mode to the motor traveling mode, the motor controller 78 of the electronic control unit 70 causes the hybrid vehicle 10 to travel, exclusively using the motor MG as the drive source, in a condition where the clutch K0 is released and the engine 12 is disconnected from the power transmission path. The motor controller 78 calculates the required driving force according to the accelerator pedal stroke Acc, for example, and controls the output of the motor MG so as to obtain the required driving force. For example, the motor controller 78 calculates the target input torque Tint of the input shaft 38 for obtaining the required driving force, according to the gear position of the automatic transmission 18, etc., and controls the output of the motor MG so as to obtain the target input torque Tint. Also, when a predetermined assist condition is satisfied, during traveling in the engine traveling mode, the motor controller 78 drives the motor MG as an auxiliary drive source, to cause the motor MG to generate driving force.

Figure 5:
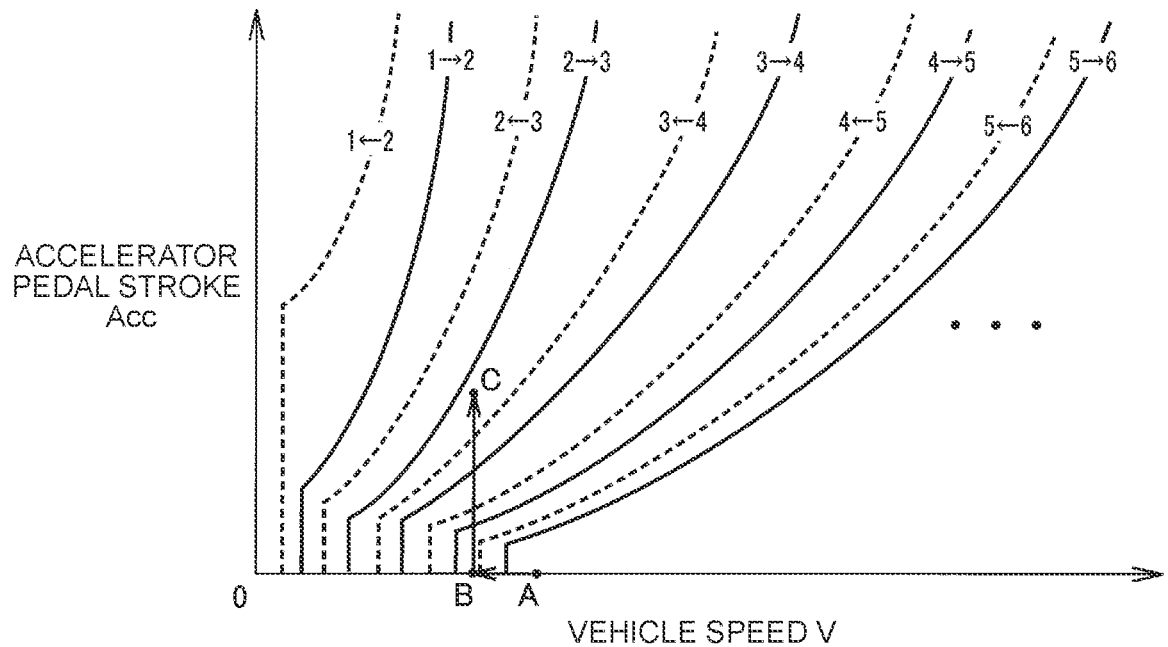
FIG. 5 is a view showing one example of a shift map for use in switching of the gear position of the automatic transmission of FIG. 2 according to operating conditions.

The shift controller 80 sets a target gear position of the automatic transmission 18 according to predetermined shift conditions, and switches the gear position of the automatic transmission 18 to the target gear position, by switching the engaged/released states of the engagement devices CB via the hydraulic control circuit 34. In FIG. 5, which is one example of a shift map as shift conditions, solid lines are upshift lines each indicating a gearshift to the higher gear position, and broken lines are downshift lines each indicating a gearshift to the lower gear position. The shift map defines the target gear position, using the accelerator pedal stroke Acc and the vehicle speed V as operating conditions, as parameters. When the actual accelerator pedal stroke Acc and vehicle speed V change, while crossing any of the upshift lines and downshift lines, namely, when the actual gear position is different from the target gear position, the shift controller 80 determines that a gearshift is needed, and executes shift control. In the case of a downshift in a power-OFF (driven) state, for example, the shift control is performed so as to increase the input rotational speed Nin (=turbine speed Nt) by increasing the hydraulic pressure (engaging pressure) of the apply-side engagement device CB, while reducing the hydraulic pressure (engaging pressure) of the release-side engagement device CB. In the case of a downshift in a power-ON (driving) state, the shift control is performed so as to increase the input rotational speed Nin with power of the engine 12 or motor MG, by keeping the hydraulic pressure of the release-side engagement device CB at a stand-by pressure Pst for a given period of time, and then gradually reducing the pressure, and increase the hydraulic pressure of the apply-side engagement device CB for engagement thereof when the input rotational speed Nin reaches around the synchronous rotation speed after shifting. In the shift map of FIG. 5, the gear position is set to the lower gear position as the accelerator pedal stroke Acc is larger and the vehicle speed V is lower, and is set to the higher gear position as the accelerator pedal stroke Acc is smaller and the vehicle speed V is higher. In FIG. 5, upshift lines and downshift lines associated with the seventh-speed gear position "7th" and the eighth-speed gear position "8th" are not illustrated.

The case as follows will be considered: during traveling of the hybrid vehicle 10 in the motor traveling mode in which the clutch K0 is released and the engine 12 is disconnected from the power transmission path, the shift controller 80 starts shift control for shifting down the automatic transmission 18, and the engine start controller 76 starts engine start control during execution of the shift control, while the shift controller 80 makes a shift determination to further shift down the automatic transmission 18.

In this case, the thermal load of the clutch K0 that is kept in the slipping state during the engine start control may be increased, and the clutch K0 may be damaged. For example, as indicated by "A→B→C" in FIG. 5, when the vehicle speed V is reduced, and the operating point moves from point "A" at which the hybrid vehicle 10 is coasting in the motor traveling mode with the accelerator OFF, i.e., with the accelerator pedal stroke Acc being equal to 0, to point "B", shift control for a 6→5 downshift (a gearshift from the sixth-speed gear position "6th" to the fifth-speed gear position "5th") is started. Then, when the accelerator pedal 61 is depressed for re-acceleration, and the operating point reaches point "C", during the shift control, a skip gearshift determination to further shift down the automatic transmission 18 to the third-speed gear position "3rd" is made, and the traveling mode is switched to the engine traveling mode when the accelerator pedal stroke Acc increases and goes beyond the mode switching line Lm of FIG. 4. As a result, the engine start controller 76 starts engine start control. When the downshift in the form of a skip gearshift and the engine start control are performed in parallel, and the starting method A is employed in which the clutch K0 is brought into the slipping state so as to raise the engine speed Ne, the motor speed Nmg corresponding to the input rotational speed Nin is increased due to the downshift, and it takes a long time to make the engine speed Ne equal to the motor speed Nmg, and fully engage the clutch K0. As a result, the thermal load of the clutch K0 may be increased, and the clutch K0 may be damaged. In order to reduce or curb damage of the clutch K0, the shift controller 80 is provided with a downshift restricting unit 82 that restricts the gear position as a destination of downshift determined based on the shift conditions, according to a predetermined condition. Namely, when the engine start control is performed, the downshift restricting unit 82 sets the shift conditions so that the gear position as the destination of downshift is restricted to the higher gear position, so as to reduce damage due to the thermal load of the clutch K0, on the assumption that the starting method A in which the clutch K0 is placed in the slipping state is employed.

Figure 10:
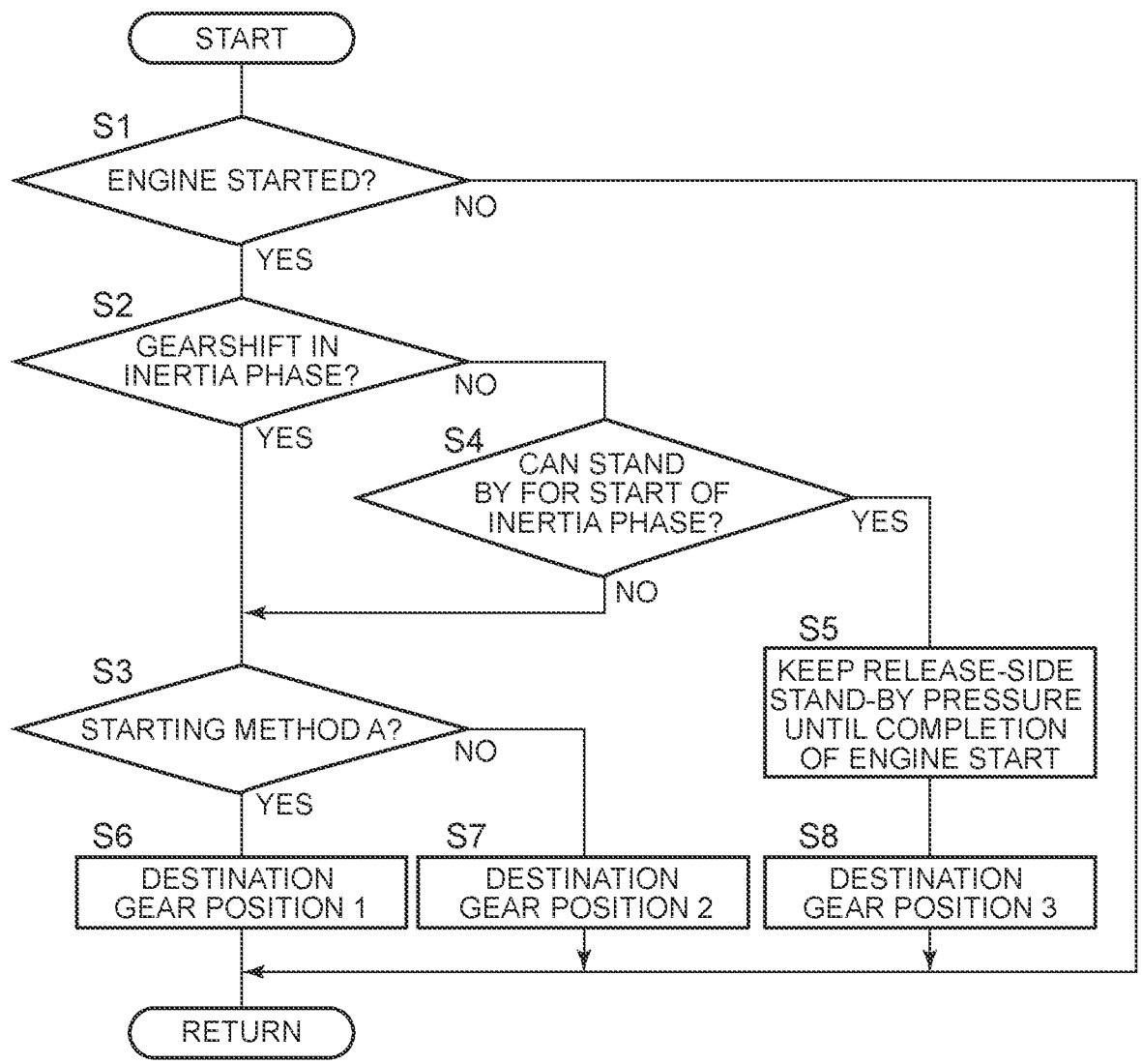
FIG. 10 is a flowchart illustrating operation of a downshift destination extending unit functionally included in the electronic control unit of FIG. 1.

On the other hand, the downshift destination extending unit 84 performs gear position extension control by easing the restriction imposed by the downshift restricting unit 82, permitting a low gear position to be determined based on the shift conditions at the start of the engine, and extending the gear position as the destination of downshift to the lower gear position. For example, the downshift destination extending unit 84 performs the gear position extension control according to the flowchart of FIG. 10. A control routine in the flowchart of FIG. 10 is executed during shift control for a downshift of the automatic transmission 18. In step S1, it is determined whether engine start control is started by the engine start controller 76. Before the engine start control is started, or during execution of the engine start control, or during operation of the engine 12, the control ends. Step S2 and subsequent steps are executed when the engine start control is newly started. In step S2, it is determined whether the downshift is in the inertia phase, and step S3 is executed when it is in the inertia phase. In step S3, it is determined whether the starting method A is employed, and step S6 is executed when the starting method A is employed, to set the gear position as a destination of the downshift to a destination gear position 1. The destination gear position 1 is a gear position determined according to the shift conditions restricted by the downshift restricting unit 82. When the starting method B, rather than the starting method A, is employed, step S7 is executed to set the gear position as a destination of the downshift to a destination gear position 2. Namely, in the case of the starting method B, the thermal load of the clutch K0 is smaller than that in the case of the starting method A; therefore, the gear position determined based on the shift conditions is permitted to be the lower gear position than that in the case of the starting method A, and the gear position as the destination of downshift is extended to the lower gear position. Thus, the destination gear position 2 is the lower gear position than the destination gear position 1. For example, when a skip gearshift determination to the third-speed gear position "3rd" is made with increase of the accelerator pedal stroke Acc, during shift control of a 6→5 downshift, the destination gear position 1 remains the fifth-speed gear position "5th", and the destination gear position 2 is set to the fourth-speed gear position "4th" or third-speed gear position "3rd", which is the lower gear position than the destination gear position 1. The destination gear position 1 may be the fourth-speed gear position "4th", and the destination gear position 2 may be the third-speed gear position "3rd". The destination gear position 1 is determined by the downshift restricting unit 82, according to the actual progress of shifting, for example. The shift controller 80 performs shift control of downshift, according to the destination gear position 1 or destination gear position 2.

Figure 11:
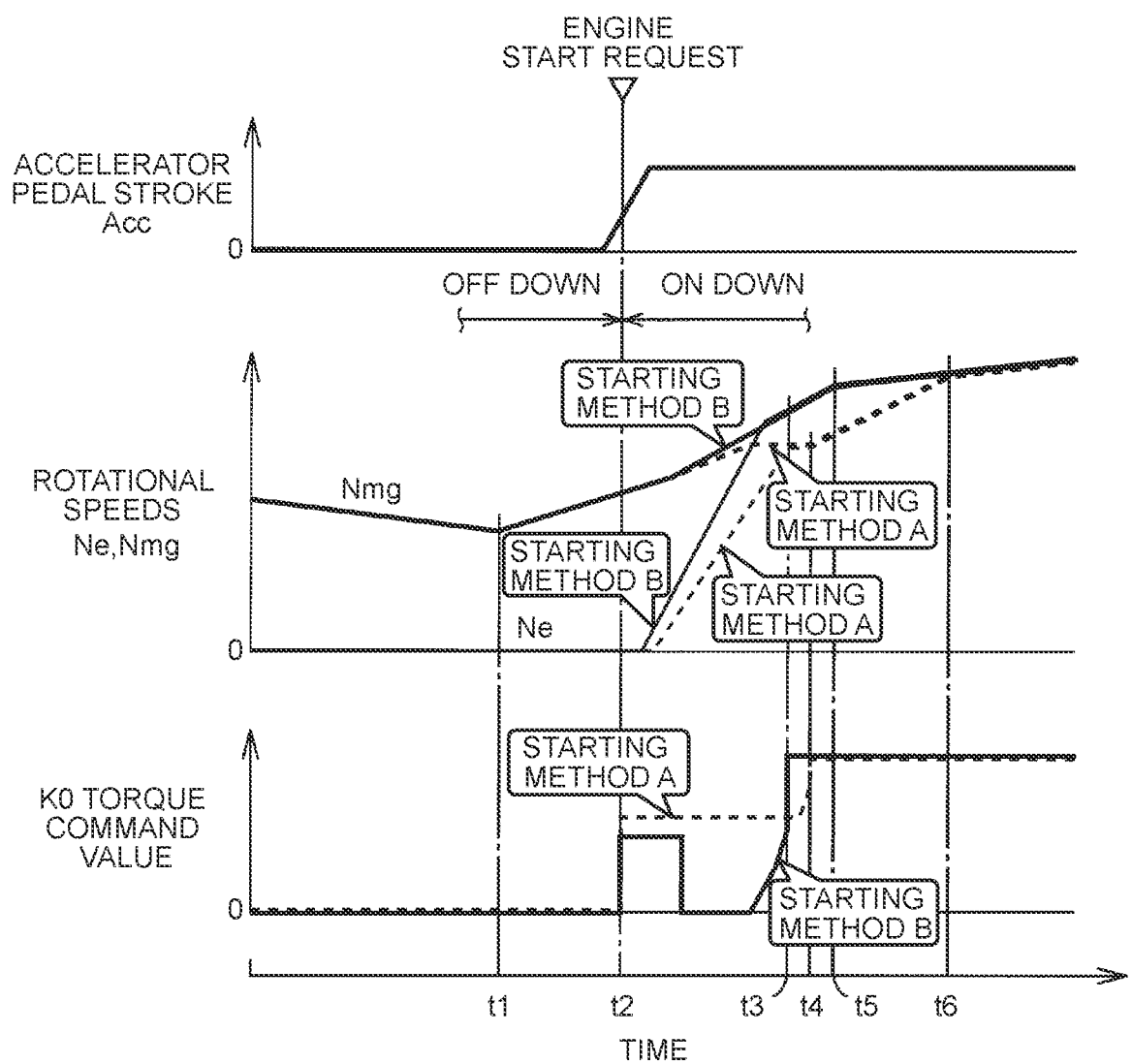
FIG. 11 is one example of a time chart showing changes in operating states of respective parts when a destination gear position of a downshift is set in step S6 or S7 of FIG. 10 at the start of the engine.
Figure 12:
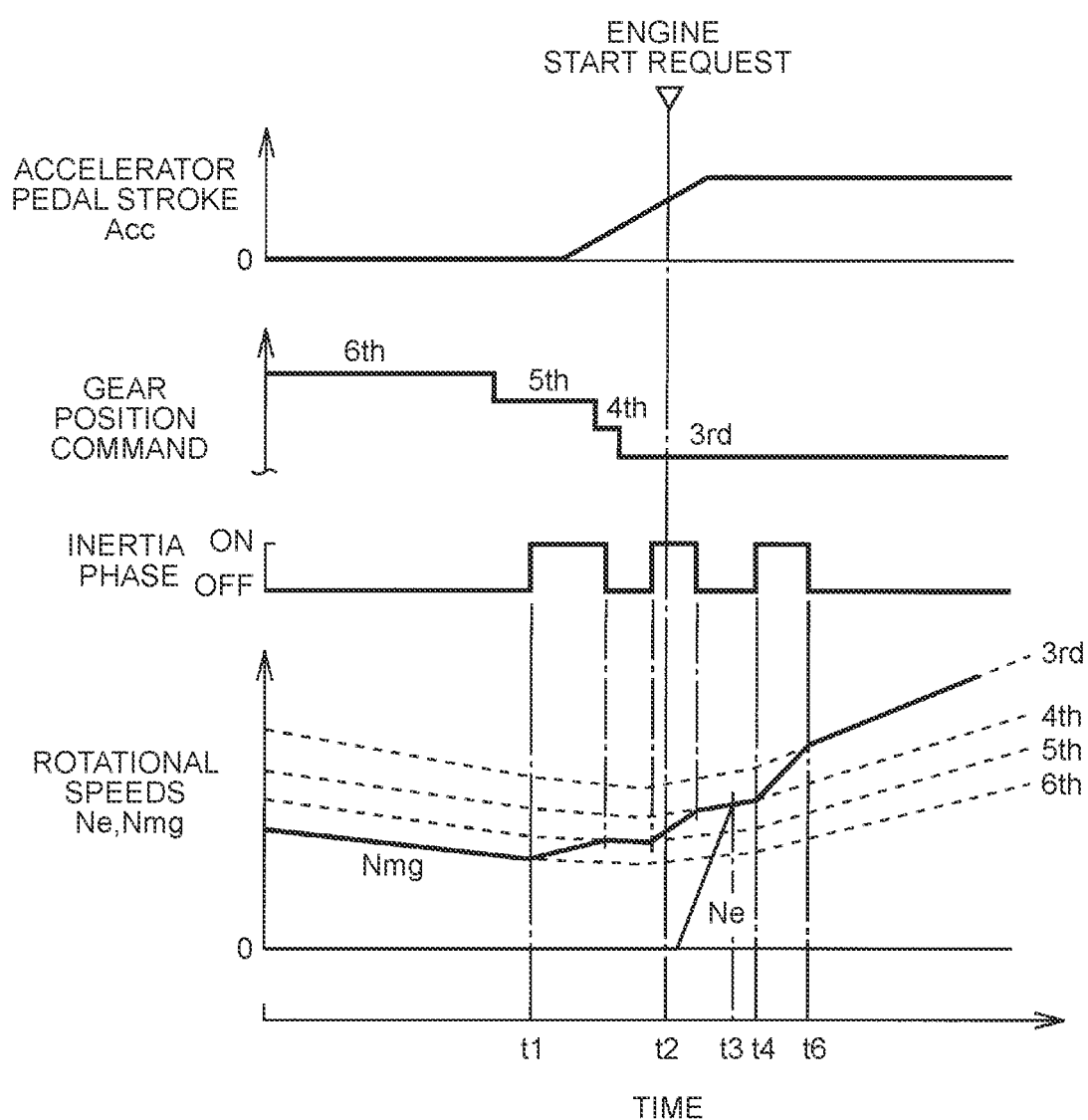
FIG. 12 is one example of a time chart specifically describing the progress of shifting when the engine is started in the starting method A in FIG. 11.

FIG. 11 is one example of a time chart showing changes in operating states of respective parts when an affirmative decision (YES) is obtained in step S2 during the inertia phase of a downshift of the automatic transmission 18, and step S6 or step S7 is executed to set the gear position to the destination gear position 1 or destination gear position 2. In FIG. 11, solid lines indicate the case where the destination gear position 2 is established in the starting method B, and broken lines indicate the case where the destination gear position 1 is established in the starting method A. In FIG. 11, "OFF DOWN" means power-OFF downshift, and "ON DOWN" means power-ON downshift. At time t1 in FIG. 11, the inertia phase starts, upon a power-OFF 6→5 downshift, as the motor speed Nmg corresponding to the input rotational speed Nin increases due to shifting from the synchronous rotation speed of the sixth-speed gear position "6th", for example. At time t2, the engine start control is started in response to operation to depress the accelerator pedal 61. The time t2 is during the inertia phase of a 5→4 downshift as shown in FIG. 12, for example, and step S3 and subsequent steps are executed, following step S2. Then, in the starting method A indicated by the broken lines, the fourth-speed gear position "4th" is set as the destination gear position 1, and the automatic transmission 18 is shifted down to the fourth-speed gear position "4th". Then, after the engine start control is completed, a 4→3 downshift is performed, to shift down the automatic transmission 18 to the third-speed gear position "3rd" as a target gear position. At time t3, in a condition where the automatic transmission 18 is shifted down to the fourth-speed gear position "4th", the engine speed Ne reaches around the K0 synchronous rotation speed equal to the motor speed Nmg, and the clutch K0 is fully engaged. At time t4, start control of the engine 12 is completed through fuel injection and ignition, and the 4→3 downshift is then performed, so that shift control is completed at time t6.

FIG. 12 is a time chart specifically illustrating the progress of shifting when the engine 12 is started in the starting method A. In FIG. 12, times t1 to t4, and t6 correspond to times t1 to t4, and t6 of FIG. 11. In FIG. 12, "ON" in a section labelled "INERTIA PHASE" means that the gearshift in question is in the inertia phase, and "OFF" means that it is not in the inertia phase. Also, each broken line in a section labelled "ROTATIONAL SPEEDS" indicates the input rotational speed Nin, or the turbine speed Nt, in each gear position, and the progress of shifting, more specifically, the current gear position, whether it is in the inertia phase or not, etc. are determined from the relationship between the turbine speed Nt and the motor speed Nmg.

On the other hand, in the starting method B indicated by the solid lines in FIG. 11, the destination gear position 2 is the third-speed gear position "3rd", and the automatic transmission 18 is directly shifted down to the third-speed gear position "3rd". In the shifting process (inertia phase), the engine speed Ne reaches around the K0 synchronous rotation speed equal to the motor speed Nmg, and the clutch K0 is fully engaged at around time t3, so that the engine start control is completed, and shift control is completed at time t5. Namely, since the automatic transmission 18 is directly shifted down to the target third-speed gear position "3rd", the required time for shifting is reduced to be shorter than that of the starting method A, and the drivability, such as a response of driving force, is improved.

Referring back to FIG. 10, when a negative decision (NO) is obtained in step S2, namely, when the gearshift is not in the inertia phase, step S4 is executed. In step S4, it is determined whether the automatic transmission 18 is able to stand by in a state before the inertia phase starts. While shift control transitions to the shift control of power-ON downshift when the accelerator pedal 61 is depressed during shift control of power-OFF downshift, the inertia phase is started in either shift control by gradually reducing the engaging pressure of the release-side engagement device CB; thus, it is determined whether the state before the inertia phase starts can be maintained through hydraulic control. For example, a graph of a release-side hydraulic command value in FIG. 13 indicates a transition to the shift control of power-ON downshift at time t2 at which the engine start control is started. When the release-side hydraulic command value is higher than a stand-by pressure Pst of power-ON downshift at time t2, the stand-by pressure Pst is maintained, so that the automatic transmission 18 can stand by in the state before the inertia state starts. The stand-by pressure Pst is a hydraulic pressure immediately before the release-side engagement device CB starts slipping, namely, a hydraulic pressure immediately before the inertia phase starts, and is determined in advance through learning control, for example. When the automatic transmission 18 cannot stand by in the state before the inertia phase starts, namely, when the inertia phase is inevitably started under hydraulic control, step S3 and subsequent step are executed as in the case during the inertia phase, and the gear position is set to the destination gear position 1 or destination gear position 2.

On the other hand, when the automatic transmission 18 can stand by in the state before the inertia phase starts, step S5 is executed to generate a stand-by command to the shift controller 80, so that the release-side hydraulic command value is kept at the stand-by pressure Pst until the engine start control is completed. Also, a destination gear position 3 is set in step S8, and shift control for shifting down the automatic transmission 18 to the destination gear position 3 is executed, by causing the shift controller 80 to reduce the release-side hydraulic command value, when the engine start control is completed, and the stand-by command for keeping the release-side hydraulic command value at the stand-by pressure Pst is cancelled. Here, since the engine start control is completed, and the clutch K0 is fully engaged, the thermal load of the clutch K0 need not be taken into consideration, and a low gear position is permitted to be established based on the shift conditions; thus, the gear position as a destination of downshift is extended to the lower gear position, irrespective of whether the engine starts in the starting method A or the starting method B. Namely, the restriction of downshift imposed by the downshift restricting unit 82 is lifted, and the destination gear position 3 is set to a target gear position obtained according to the shift map, for example, the third-speed gear position "3rd". Thus, the destination gear position 3 is extended to the lower gear position than at least the destination gear position 1, and is set to be equal to the destination gear position 2 or to be the lower gear position than the destination gear position 2.

Figure 13:
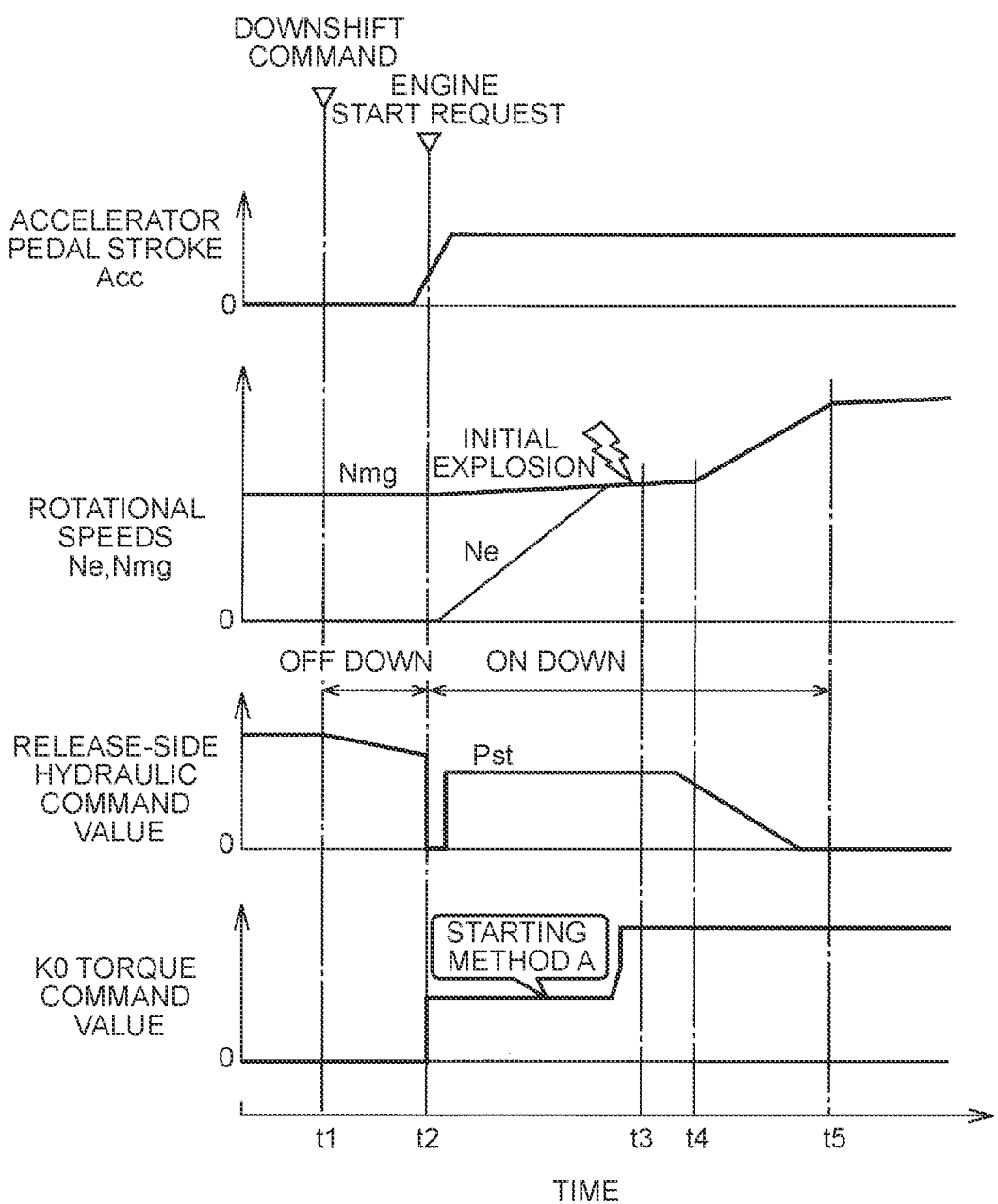
FIG. 13 is one example of a time chart showing changes in operating states of respective parts when a destination gear position of a downshift is set in step S8 of FIG. 10 at the start of the engine.

FIG. 13 is one example of a time chart showing changes in the operating states of respective parts when a negative decision (NO) is obtained in step S2, and steps S5, S8 are executed, following step S4, so that the destination gear position 3 is established. At time t1 in FIG. 13, the vehicle speed V is reduced during coasting in the accelerator OFF state (with the accelerator pedal 61 released) in the motor traveling mode, for example, and shift control for a 6→5 downshift is started. At time t2, the engine start control according to the starting method A is started in response to the operation to depress the accelerator pedal 61. At time t2, which is ahead of the start of the inertia phase of the 6→5 downshift, the release-side hydraulic pressure command value is higher than the stand-by pressure Pst in the case of a transition to shift control for power-ON downshift; thus, the automatic transmission 18 can stand by in a state before the inertia phase starts. Namely, the release-side hydraulic pressure command value is kept at the stand-by pressure Pst, until time t3 at which the engine start control is completed, i.e., until the engine 12 becomes able to rotate by itself through fuel injection and ignition after the engine speed Ne is increased through slipping engagement of the clutch K0, and reaches around the K0 synchronous rotation speed equal to the motor speed Nmg, so that the clutch K0 is fully engaged. Then, once the engine start control is completed, the release-side hydraulic command value is reduced from the stand-by pressure Pst, the inertia phase in which the motor speed Nmg increases starts (time t4), and the automatic transmission 18 is shifted directly down to the third-speed gear position "3rd" of the target gear position as the destination gear position (time t5).

In the electronic control unit 70 of the hybrid vehicle 10 as described above, when the engine start control is started by the engine start controller 76 while the automatic transmission 18 is shifted down under shift control by the shift controller 80, and the downshift is in the inertia phase, or the automatic transmission 18 cannot stand by in the state before the start of the inertia phase, the destination gear position 2 of the case (S7) where the engine 12 is started in the starting method B is extended to the lower gear position than the destination gear position 1 of the case (S6) where the engine 12 is started in the starting method A. Namely, in the starting method B in which the engine 12 rotates by itself through ignition from the stage where the engine speed Ne is low, slipping engagement of the clutch K0 is relatively small, and the clutch K0 is unlikely to be damaged by a thermal load due to slipping engagement of the clutch K0, even when the gear position as a destination of the downshift is a relatively low gear position, the amount of increase of the motor speed Nmg due to the downshift is large, and a speed difference between the motor speed Nmg and the engine speed Ne is large. Thus, a low gear position is permitted to be set based on the shift conditions, and the automatic transmission 18 can be promptly shifted down to the target gear position. Also, since the motor speed Nmg becomes relatively high due to the downshift to the relatively low gear position, shock caused by the inertia of the engine 12 is less likely or unlikely to be generated when the clutch K0 is fully engaged after start of the engine, and the engine 12 is connected to the motor MG.

On the other hand, when the engine 12 is started in the starting method A in which the engine speed Ne is increased through slipping engagement of the clutch K0, the clutch K0 may be damaged due to the thermal load caused by slipping engagement; thus, it is not appropriate to ease restriction on the shift conditions, and the gear position is set to the destination gear position 1 in step S6 according to the shift conditions restricted by the downshift restricting unit 82. Thus, the amount of increase of the motor speed Nmg caused by downshift is reduced as indicated by a broken line in FIG. 11, and the difference between the motor speed Nmg and the engine speed Ne (=0) is reduced; as a result, the thermal load due to slipping engagement of the clutch K0 is reduced, and damage of the clutch K0 is curbed.

When the motor speed Nmg is equal to or higher than the method B lower-limit rotational speed Ntdc at the start of the engine start control, the starting method B is carried out, to complete the engine start control. Thus, the engine start control is performed in the starting method B in a condition where the motor speed Nmg is relatively high. Further, a low gear position is permitted to be set based on the shift conditions in the starting method B, and the gear position as a destination of downshift is set to the destination gear position 2 that is a relatively low gear position, so that the motor speed Nmg is further increased; as a result, shock generated due to the inertia of the engine 12 when the clutch K0 is fully engaged and the engine 12 is connected to the motor MG is appropriately curbed or reduced. On the other hand, when the motor speed Nmg is lower than the method B lower-limit rotational speed Ntdc at the start of the engine start control, the starting method A is carried out, and the engine start control is completed. With the gear position as a destination of the downshift being limited to the destination gear position 1 as a high gear position determined according to the shift conditions, the engine start control is performed in the starting method A, in a condition where the motor speed Nmg is relatively low, and damage due to the thermal load of the clutch K0 is appropriately curbed.

Also, the destination gear position 3 established in the case where the engine start control is started by the engine start controller 76 while the automatic transmission 18 is shifted down under shift control by the shift controller 80, and the inertia phase has not been started or the automatic transmission 18 can stand by in the state before the start of the inertia phase (YES in step S4) is extended to the lower gear position than the destination gear position 1 or 2 established in the case where the downshift is in the inertia phase (YES in step S2), or the case where the inertia phase has not been started and the automatic transmission 18 cannot stand by in the state before the start of the inertia phase (NO in step S4). Namely, when the inertia phase has not been started, and the automatic transmission 18 can stand by in the state before the start of the inertia phase, the motor speed Nmg is kept at a relatively low speed, by causing the automatic transmission 18 to stand by in the state before the start of the inertia phase. Thus, even when the engine 12 is started in the starting method A, the thermal load due to slipping engagement of the clutch K0 is small, and damage of the clutch K0 is curbed. Also, since the clutch K0 is fully engaged after the engine start control is completed, there is no need to restrict the destination gear position 3 as the gear position to which the automatic transmission 18 is shifted down, and a low gear position is permitted to be established based on the shift conditions; thus, the automatic transmission 18 can be promptly shifted down to the target gear position. More specifically, the restriction on downshift imposed by the downshift restricting unit 82 is lifted, and the target gear position obtained according to the shift map, e.g., the third-speed gear position "3rd", is set as the destination gear position 3 of step S8, and the automatic transmission 18 can be shifted directly down to the third-speed gear position "3rd".

On the other hand, when the downshift is in the inertia phase (YES in step S2), or when the inertia phase has not been started, and the automatic transmission 18 cannot stand by in the state before the start of the inertia phase (NO in step S4), the gear position as a destination of the downshift is restricted to the higher gear position. More specifically, the destination gear position 3 of step S8 is not restricted, whereas at least the destination gear position 1 of step S6 is restricted to the higher gear position determined according to the shift conditions restricted by the downshift restricting unit 82. The destination gear position 2 of step S7 is set to the same gear position as or a higher gear position than the destination gear position 3. Namely, when the downshift has proceeded into the inertia phase, the motor speed Nmg is already increased; therefore, the gear position as the destination of the downshift is restricted to the higher gear position, so that further increase of the motor speed Nmg is curbed. As a result, even in the case where the engine 12 is started in the starting method A, the thermal load due to slipping engagement of the clutch K0 is reduced, and the clutch K0 is less likely or unlikely to be damaged. When the inertia phase has not been started, but the automatic transmission 18 cannot stand by in the state before the start of inertia phase, the motor speed Nmg increases as the downshift proceeds; thus, the gear position as the destination of downshift is similarly restricted to the higher gear position, so that the thermal load due to slipping engagement of the clutch K0 is reduced.

Also, the shift controller 80 of this embodiment reduces the hydraulic pressure of the release-side engagement device CB as one of the engagement devices CB, to allow the input rotational speed Nin (=the turbine speed Nt) to increase, for progression of the downshift. Since the shift controller 80 keeps the automatic transmission 18 in the state before the start of the inertia phase, by generating a command to interrupt reduction of the hydraulic pressure, i.e., a command to hold the hydraulic pressure at the stand-by pressure Pst (step S5), the motor speed Nmg is kept at a relatively low speed, and the engine 12 can be appropriately started while the thermal load of the clutch K0 is reduced even when the engine 12 is started in the starting method A.

Next, another embodiment of the present disclosure will be described. In the following embodiment, the same reference signs are assigned to components or portions that are substantially common to the above embodiment and this embodiment, and these components or portions will not be described in detail.

Figure 14:
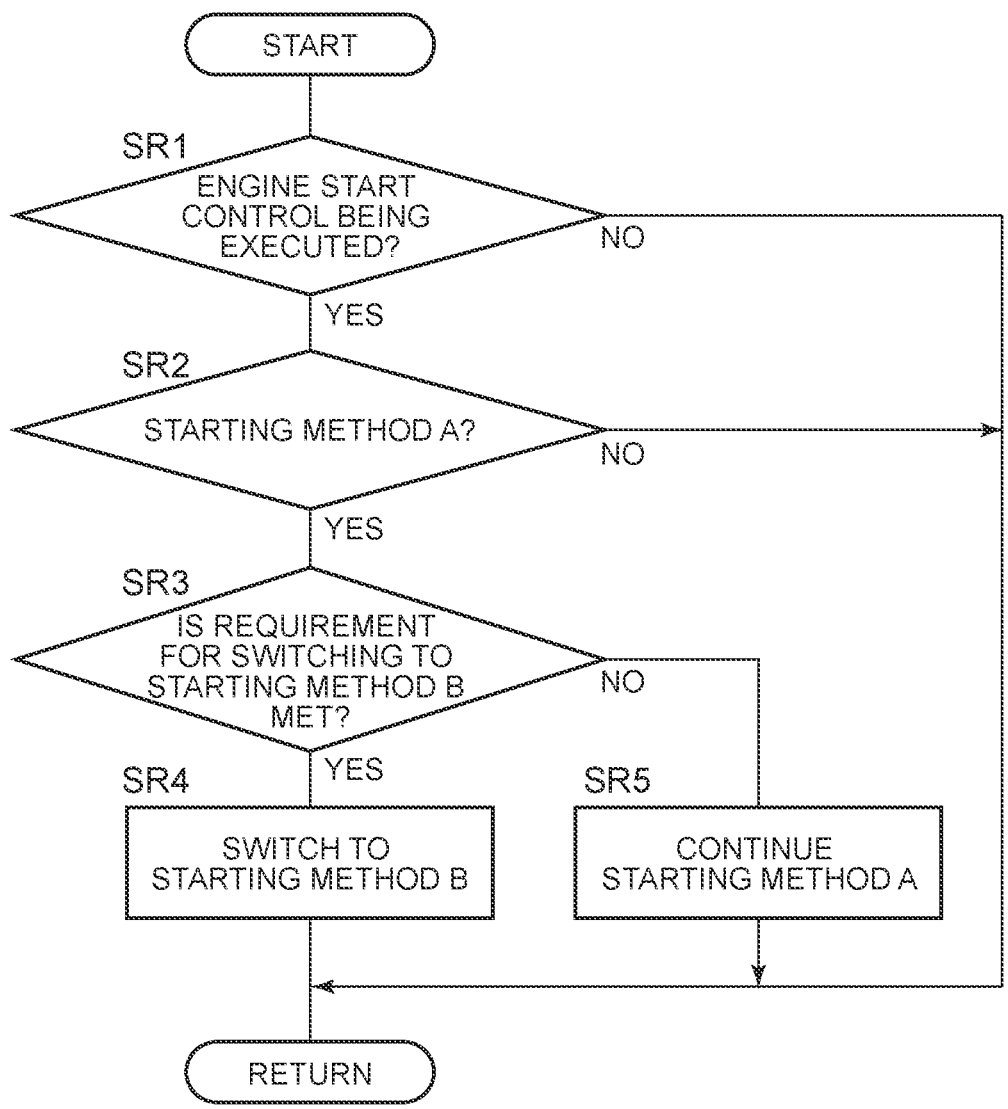
FIG. 14 is a flowchart illustrating another embodiment in which the engine start controller of FIG. 1 switches the starting method to the starting method B when a given requirement is met during execution of engine start control in the starting method A.

The engine start controller 76 of the above embodiment determines the engine starting method according to the motor speed Nmg at the start of the engine start control, and completes the engine start control in the engine starting method thus determined. However, the starting method may be changed during execution of the engine start control as shown in FIG. 14. FIG. 14 is a flowchart of a control routine executed after the engine starting method is selected according to the flowchart of FIG. 6, and execution of the engine start control is started. In step SR1, it is determined whether engine start control is being executed. When the engine start control is not being executed, the control ends. When the engine start control is being executed, step SR2 is executed. In step SR2, it is determined whether the engine starting method is the starting method A. When the engine starting method is not the starting method A, namely, when it is the starting method B, the control ends. When the engine starting method is the starting method A, step SR3 is executed. Namely, in the starting method B, the engine 12 rotates by itself through fuel injection and ignition while the engine speed Ne is in a low-speed range, and thus, there is no room for switching to the starting method A. On the other hand, in the starting method A, it takes a relatively long time to raise the engine speed Ne through slipping engagement of the clutch K0, and the thermal load of the clutch K0 is increased as the motor speed Nmg increases in the process of the engine start control; thus, it is desirable to switch the starting method to the starting method B as needed.

In step SR3, it is determined whether a predetermined requirement for switching to the starting method B is met, and step SR4 is executed to switch the starting method to the starting method B when the switching requirement is met. When the switching requirement is not met, step SR5 is executed, and the starting method A is continued. The switching requirement is that the motor speed Nmg becomes equal to or higher than the method B lower-limit rotational speed Ntdc. Namely, when the motor speed Nmg increases with increase of the accelerator pedal stroke Acc or progression of the downshift, for example, and becomes equal to or higher than the method B lower-limit rotational speed Ntdc, the thermal load of the clutch K0 which appears when the engine speed Ne is raised to the K0 synchronous rotational speed equal to the motor speed Nmg is increased; therefore, it is desirable to switch from the starting method A to the starting method B. In this case, the method B lower-limit rotational speed Ntdc corresponds to the second determination value, and is equal to the method B lower-limit rotational speed Ntdc used when the engine starting method is selected in step SS2 of FIG. 6. The method B lower-limit rotational speed Ntdc is determined, using the accelerator pedal stroke Acc, the gear position of the automatic transmission 18, and the engagement state of the lock-up clutch LU, as parameters. However, the method B lower-limit rotational speed Ntdc as the second determination value may be different from that as the first determination value: for example, the second determination value may be set to a higher rotational speed than the method B lower-limit rotational speed Ntdc. When a rotational speed difference ΔN between the motor speed Nmg and the engine speed Ne is small, shock may be generated when the clutch K0 is fully engaged after the starting method B is carried out to rotate the engine 12 by itself. Thus, a condition that the rotational speed difference ΔN is equal to or larger than a given permissible determination value a may be added as an AND condition to the switching requirement. Also, other switching requirements, such as the case where the execution time of the engine start control exceeds a predetermined permissible time, may be added as an OR condition or AND condition.

Figure 15:
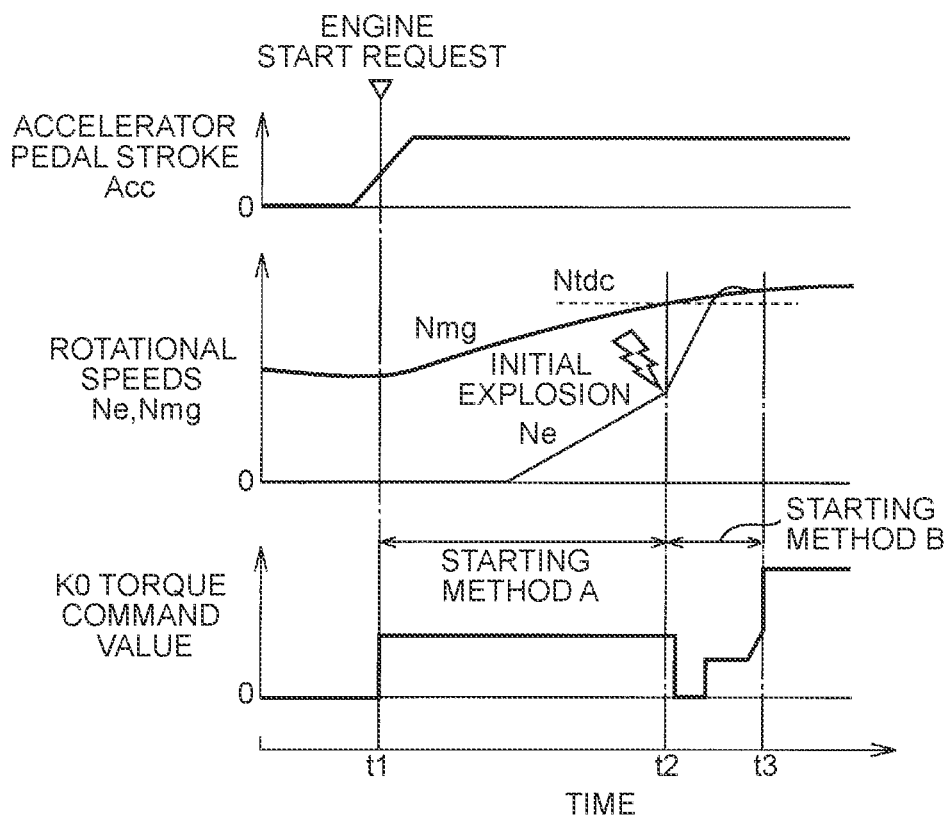
FIG. 15 is one example of a time chart showing changes in operating states of respective parts when the starting method is switched from the starting method A to the starting method B according to the flowchart of FIG. 14.

FIG. 15 is one example of a time chart showing changes in the operating states of respective parts when the starting method is switched from the starting method A to the starting method B according to the flowchart of FIG. 14. At time t1 of FIG. 15, the engine start control is started in the starting method A, according to an engine start request made by operation to depress the accelerator pedal 61. While the engine speed Ne is increased through slipping engagement of the clutch K0, the accelerator pedal 61 is kept depressed in this example, and the motor speed Nmg increases according to the accelerator pedal stroke Acc. At time t2, the motor speed Nmg reaches the method B lower-limit rotational speed Ntdc, and an affirmative decision (YES) is obtained in step SR3, so that the starting method is switched to the starting method B. At time t2, the fuel injection and the ignition immediately take place, so that the engine 12 rotates by itself, and the clutch K0 is released. Then, at time t3 at which the engine speed Ne reaches around the K0 synchronous rotation speed equal to the motor speed Nmg, the clutch K0 is fully engaged, and the engine start control is completed in the starting method B. Namely, through switching to the starting method B, the clutch K0 is less likely or unlikely to be damaged due to the thermal load of the clutch K0, irrespective of the increase of the motor speed Nmg during the engine start control.

Figure 16:
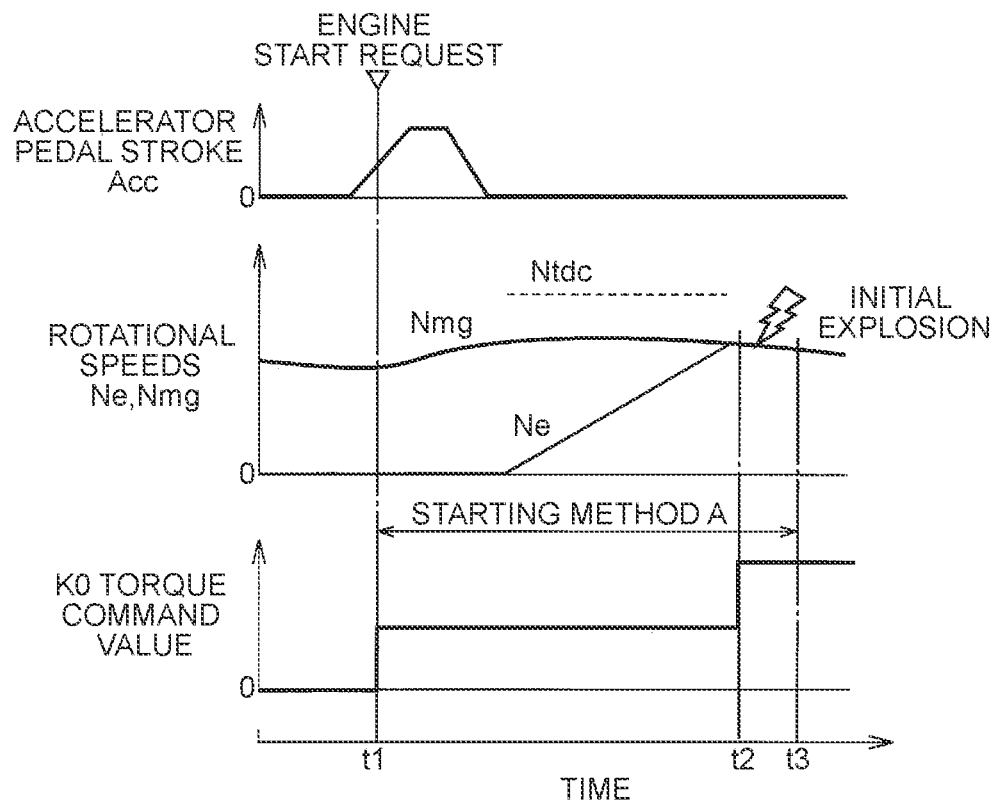
FIG. 16 is one example of a time chart showing changes in operating states of respective parts when the starting method A is maintained according to the flowchart of FIG. 14.

FIG. 16 is one example of a time chart showing changes in the operating states of respective parts in the case where the starting method A is maintained according to the flowchart of FIG. 14. Namely, at time t1, the engine start control is started in the starting method A, according to an engine start request made by operation to depress the accelerator pedal 61, as in the time chart of FIG. 15. However, in this example, the accelerator pedal 61 is only temporarily depressed, and is released in a short time, and the motor speed Nmg is kept in a low rotational speed range that is lower than the method B lower-limit rotational speed Ntdc. Thus, a negative decision (NO) is obtained in step SR3, and the starting method A is continued. At time t2, the engine speed Ne reaches around the K0 synchronous rotation speed equal to the motor speed Nmg, and the clutch K0 is fully engaged. Then, at time t3 at which the engine 12 rotates by itself through fuel injection and ignition, the engine start control is completed.

Thus, when the engine start controller 76 of this embodiment starts the engine 12 in the starting method A, it switches the starting method to the starting method B when the motor speed Nmg becomes equal to or higher than the method B lower-limit rotational speed Ntdc, before the engine start control is completed, namely, in the process of raising the engine speed Ne through slip control of the clutch K0. As a result, damage of the clutch K0 due to the thermal load is appropriately curbed, irrespective of the increase of the motor speed Nmg during the engine start control.

The downshift destination extending unit 84 may perform gear position extension control based on the engine starting method at the start of the engine start control, according to the flowchart of FIG. 10, irrespective of switching of the engine starting method according to the flowchart of FIG. 14. However, the downshift destination extending unit 84 may change the gear position as a destination of downshift according to switching of the engine starting method, as in the flowchart of FIG. 17. Namely, it is determined in step R1 whether the engine start control is being executed by the engine start controller 76, and step R2 and subsequent steps are executed when the engine start control is being executed. Steps R2, R3, R5 and R6 are substantially identical with steps S2, S3, S6, and S7 of the flowchart of FIG. 10, and the destination gear position I is equal to the destination gear position 1, while the destination gear position II is equal to the destination gear position 2. With steps R3 and subsequent step thus repeatedly executed during execution of the engine start control, when the engine starting method is switched from the starting method A to the starting method B, according to the flowchart of FIG. 14, the shift conditions permit a low gear position to be established in response to the switching, and the gear position as a destination of downshift is changed from the destination gear position I to the destination gear position II. More specifically, the destination gear position I set based on the shift conditions in the case of the starting method A is restricted to the higher gear position as compared with the destination gear position II set based on the shift conditions in the case of the starting method B. However, the restriction is eased or lifted, and the gear position is extended to the lower gear position. For example, when the destination gear position I is the fourth-speed gear position "4th", the third-speed gear position "3rd" as the target gear position is set as the destination gear position II.

Thus, when the engine starting method is switched from the starting method A to the starting method B, and the restriction on the gear position as a destination of downshift is eased upon switching of the starting method, the automatic transmission 18 can be promptly shifted down to the target gear position, while shock generated due to the inertia of the engine 12 when the clutch K0 is fully engaged because of the increase of the motor speed Nmg can be appropriately reduced.

Referring back to FIG. 17, when a negative decision (NO) is obtained in step R2, namely, when the downshift is not in the inertia phase, step R4 is executed. In step R4, it is determined whether the clutch K0 is in the post synchronization stage, namely, whether the engine speed Ne has reached the K0 synchronous rotation speed equal to the motor speed Nmg as the engine start control proceeds. When the clutch K0 is not in the post synchronization stage, namely, when the engine speed Ne has not reached the K0 synchronous rotation speed, step R7 is executed to establish the destination gear position III. When the clutch K0 is in the post synchronization stage, step R8 is executed to establish the destination gear position IV. When the clutch K0 is in the post synchronization stage, the clutch K0 is already fully engaged, or is highly likely to be promptly fully engaged even if it has not been fully engaged; therefore, the thermal load of the clutch K0 need not be taken into consideration, and the gear position as a destination of downshift need not be restricted, no matter which of the starting method A and the starting method B is employed. Namely, since the shift conditions permit a low gear position to be established, the restriction on downshift imposed by the downshift restricting unit 82 is lifted, and the target gear position obtained according to the shift map, e.g., the third-speed gear position "3rd", is set as the destination gear position IV of step R8, for example. On the other hand, when the clutch K0 has not been synchronized, the clutch K0 is in slipping state when the engine starting method is the starting method A; therefore, the K0 clutch may be damaged by thermal load. In this case, it is not appropriate to lift the restriction on downshift by the downshift restricting unit 82, and the destination gear position III is restricted to the higher gear position than the destination gear position IV. When the destination gear position III is determined according to the engine starting method, it is restricted to the higher gear position, e.g., the fourth-speed gear position "4th" or the fifth-speed gear position "5th", than the destination gear position IV, at least in the case of the starting method A, and the destination gear position III is the same as the destination gear position IV or is restricted to the higher gear position than the destination gear position IV in the case of the starting method B. When a negative decision (NO) is obtained in step R4, step R3 and subsequent step may be executed, and step R7 may be omitted.

Figure 17:
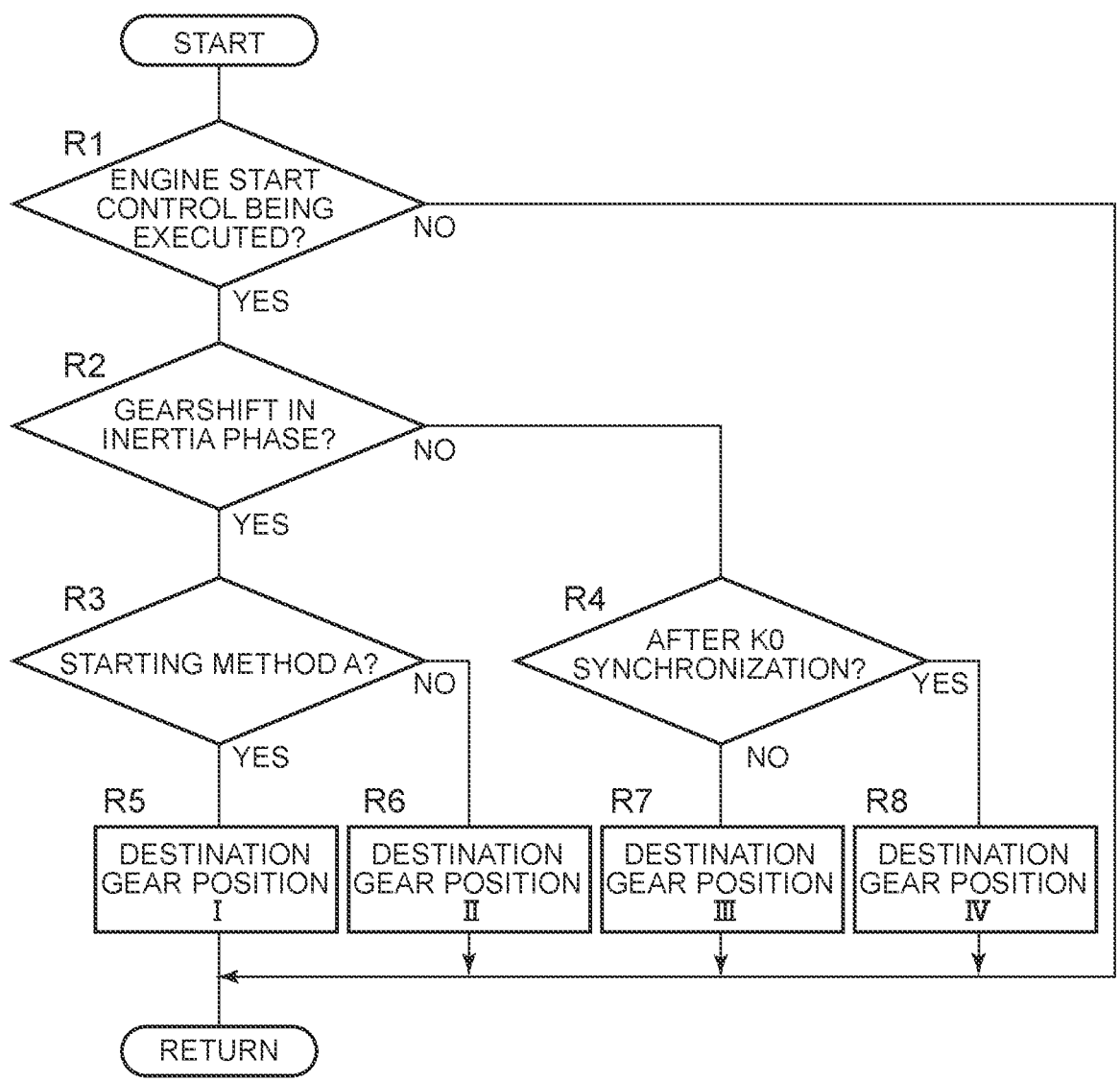
FIG. 17 is a flowchart illustrating another embodiment in which the downshift destination extending unit of FIG. 1 changes a gear position as a destination of downshift during execution of the engine start control.
Figure 18:
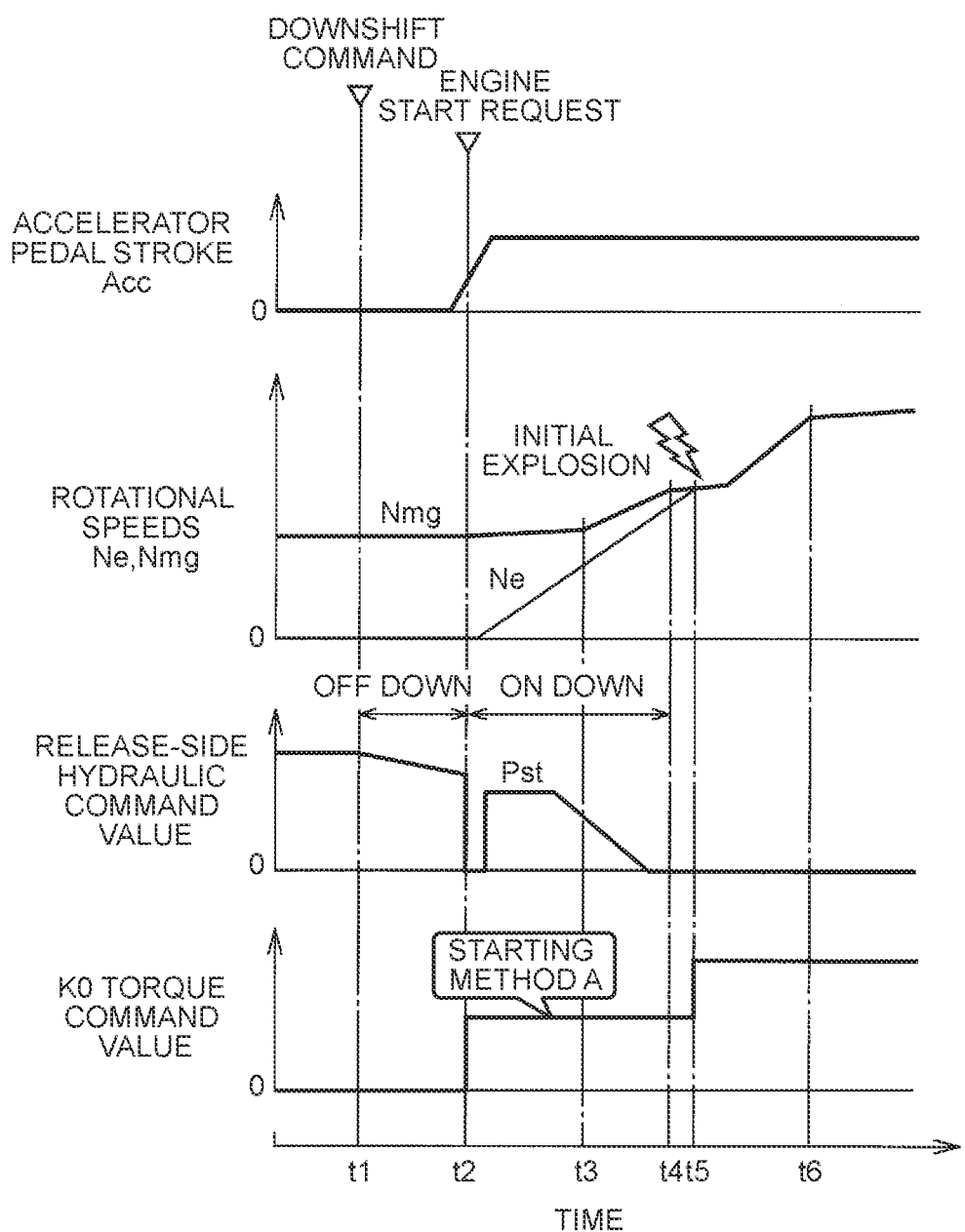
FIG. 18 is one example of a time chart showing changes in operating states of respective parts when the destination gear position of downshift is set according to the flowchart of FIG. 17, during execution of the engine start control.

FIG. 18 is one example of a time chart showing changes in the operating states of respective parts in the case where gear position extension control is executed according to the flowchart of FIG. 17. At time t1 of FIG. 18, the vehicle speed V is reduced during coasting with the accelerator pedal released (accelerator OFF) in the motor traveling mode, and shift control for a 6→5 downshift is started by the shift controller 80. At time t2, the engine start controller 76 starts engine start control in the starting method A, in response to operation to depress the accelerator pedal 61. At this time, the target gear position based on the shift map is the third-speed gear position "3rd", for example, as the accelerator pedal stroke Acc increases, but step R7 is executed because the inertia phase of the 6→5 downshift has not started, and the clutch K0 has not synchronized, and the gear position according to the shift conditions restricted by the downshift restricting unit 82, e.g., the fifth-speed gear position "5th", is set as the destination gear position III. At time t3, the inertia phase in which the motor speed Nmg is increased with reduction of the hydraulic pressure of the release-side engagement device CB is started, while the engine speed Ne is increased through slipping engagement of the clutch K0. Once the inertia phase starts, step R5 is executed, and the destination gear position I, e.g., the fifth-speed gear position "5th", is set as the gear position as the destination of downshift.

At time t4 of FIG. 18, the motor speed Nmg reaches the synchronous rotation speed of the fifth-speed gear position "5th", and the downshift to the fifth-speed gear position "5th" ends. At time t5, the engine speed Ne reaches the K0 synchronous rotation speed equal to the motor speed Nmg through slipping engagement of the clutch K0, and the clutch K0 is fully engaged. Then, the engine 12 rotates by itself through fuel injection and ignition. In this case, the gear position as the destination of the downshift is restricted to the fifth-speed gear position "5th"; therefore, the motor speed Nmg is relatively low, and the engine start control by the starting method A can be appropriately performed in a short time, so that the clutch K0 is less likely or unlikely to be damaged by the thermal load. Then, in a condition where the fifth-speed gear position "5th" is established, namely, before the inertia phase of the next gearshift is started, and after the engine speed Ne reaches the K0 synchronous rotation speed equal to the motor speed Nmg, i.e., the clutch K0 is synchronized, step R8 is executed, and the destination gear position IV without restriction, for example, the third-speed gear position "3rd" as a target gear position, is set as the gear position as the destination of downshift. Namely, shift control for a 5→3 downshift is started by the shift controller 80 at time t5, and the shift control for the 5→3 downshift ends at time t6.

FIG. 18 illustrates the case where the automatic transmission 18 is shifted down to the destination gear position I or III restricted according to the shift conditions, before the K0 synchronization, i.e., before the engine speed Ne reaches the K0 synchronous rotation speed equal to the motor speed Ngm. When the clutch K0 is synchronized before the downshift proceeds, namely, before the inertia phase starts, the destination gear position IV is set immediately after the K0 synchronization, and shift control of non-restricted downshift is performed. Namely, the engine start control and shift control are carried out in similar manners to those in the time chart shown in FIG. 13, for example, and a 6→3 downshift is performed to shift down the automatic transmission 18 to the third-speed gear position "3rd" immediately after the engine start control is completed at time t3.

Thus, in the embodiment of FIG. 17, when the engine start control is started while the automatic transmission 18 is shifted down, the destination gear position IV set before the inertia phase starts and after the clutch K0 is synchronized is extended to be the lower gear position than the destination gear position III set before the inertia phase starts and before the clutch K0 is synchronized. Namely, before the inertia phase starts and after the clutch K0 is synchronized, there is no possibility of damage of the clutch K0 due to a thermal load caused by slipping engagement, and there is no need to restrict the destination gear position IV. Therefore, the shift conditions permit a low gear position to be established, and the automatic transmission 18 can be promptly shifted down to the target gear position. On the other hand, the destination gear position III set before the inertia phase starts and before the clutch K0 is synchronized is restricted to the higher gear position than the destination gear position IV set before the inertia phase starts and after the clutch K0 is synchronized. As a result, the motor speed Nmg is less likely or unlikely to be increased, and the thermal load due to slipping engagement of the clutch K0 is reduced, so that damage of the clutch K0 is curbed, even when the engine 12 is started in the starting method A.

In the illustrated embodiments, the case where a 5→3 downshift is executed after a 6→5 downshift, and the case where a 4→3 downshift is executed after a 6→4 downshift, due to the restriction on downshift by the downshift restricting unit 82, and lifting of the restriction on downshift by the downshift destination extending unit 84, and the case where a 6→3 downshift is executed, have been described. However, the type, number of times, etc. of downshift may be varied, depending on the starting time of the engine start control, the progress of gearshift, and so forth.

While some embodiments of the present disclosure have been described in detail based on the drawings, these are mere examples, and the present disclosure may be embodied with various changes or improvements, based on the knowledge of those skilled in the art.

What is claimed is:

1. A control device of a hybrid vehicle, the hybrid vehicle including an engine, an electric motor configured to receive power from the engine via an engine connecting and disconnecting device of a frictional engagement type, and an automatic transmission provided on a downstream side of the electric motor on a power transmission path of the hybrid vehicle, the control device comprising an electronic control unit configured to:
   execute engine start control to control the engine and the engine connecting and disconnecting device so as to start the engine during traveling such that the engine rotates by itself, and fully engage the engine connecting and disconnecting device;
   control the automatic transmission to switch a gear position of the automatic transmission between a plurality of gear positions, according to predetermined shift conditions;
   control the engine under the engine start control to start the engine in a selected one of a first starting method in which the engine performs ignition and rotates by itself after an engine speed as a rotational speed of the engine is increased to be equal to or higher than a predetermined rotational speed through slipping engagement of the engine connecting and disconnecting device, and a second starting method in which the engine performs ignition and rotates by itself from a stage before the engine speed reaches the predetermined rotational speed; and
   control the automatic transmission to permit a lower gear position to be established according to the shift conditions in a case where the engine is started in the second starting method during a downshift of the automatic transmission, as compared with a case where the engine is started in the first starting method during the downshift of the automatic transmission.

2. The control device of the hybrid vehicle according to claim 1, wherein the electronic control unit is configured to control the engine to complete the engine start control by executing the first starting method when a motor speed as a rotational speed of the electric motor is lower than a predetermined first determination value at a start of the engine start control, and complete the engine start control by executing the second starting method when the motor speed is equal to or higher than the first determination value at the start of the engine start control.

3. The control device of the hybrid vehicle according to claim 1, wherein:
   the electronic control unit is configured to control the engine to switch to the second starting method when a motor speed as a rotational speed of the electric motor becomes equal to or higher than a predetermined second determination value, before the engine start control is completed through execution of the first starting method; and
   the electronic control unit is configured to control the automatic transmission such that, when a starting method of the engine is switched from the first starting method to the second starting method during shift control of the automatic transmission, the shift conditions permit a lower gear position than that based on the shift conditions in the first starting method to be established, in response to switching of the starting method.

4. A control device of a hybrid vehicle, the hybrid vehicle including an engine, an electric motor configured to receive power from the engine via an engine connecting and disconnecting device of a frictional engagement type, and an automatic transmission provided on a downstream side of the electric motor on a power transmission path of the hybrid vehicle, the control device comprising an electronic control unit configured to:
   execute engine start control to control the engine and the engine connecting and disconnecting device so as to start the engine during traveling such that the engine rotates by itself, and fully engage the engine connecting and disconnecting device;
   control the automatic transmission to switch a gear position of the automatic transmission between a plurality of gear positions, according to predetermined shift conditions, by switching engaged and released states of a plurality of frictional engagement devices of the automatic transmission; and
   control the automatic transmission when the engine start control is started during a downshift of the automatic transmission, to permit a lower gear position to be established according to the shift conditions, in a case where an inertia phase in which an input rotational speed of the automatic transmission is increased has not started, and the automatic transmission is able to stand by in a state before start of the inertia phase, as compared with a case where the downshift is in the inertia phase or a case where the inertia phase has not started, and the automatic transmission is unable to stand by in the state before start of the inertia phase.

5. The control device of the hybrid vehicle according to claim 4, wherein:
the electronic control unit is configured to perform shift control of the downshift, by reducing an engaging pressure of a release-side frictional engagement device as one of the frictional engagement devices, and permitting increase of the input rotational speed; and
the electronic control unit is configured to enable the automatic transmission to stand by in the state before start of the inertia phase, by generating a command to stop reduction of the engaging pressure.

6. The control device of the hybrid vehicle according to claim 4, wherein the electronic control unit is configured to control the engine and the engine connecting and disconnecting device to start the engine in a first starting method in which the engine performs ignition and rotates by itself after an engine speed as a rotational speed of the engine is increased to be equal to or higher than a predetermined rotational speed through slipping engagement of the engine connecting and disconnecting device.

7. A control device of a hybrid vehicle, the hybrid vehicle including an engine, an electric motor configured to receive power from the engine via an engine connecting and disconnecting device of a friction engagement type, and an automatic transmission provided on a downstream side of the electric motor on a power transmission path of the hybrid vehicle, the control device comprising an electronic control unit configured to:
execute engine start control to control the engine and the engine connecting and disconnecting device so as to start the engine during traveling such that the engine rotates by itself, and fully engage the engine connecting and disconnecting device;
control the automatic transmission to switch a gear position of the automatic transmission between a plurality of gear positions, according to predetermined shift conditions, by switching engaged and released states of a plurality of frictional engagement devices of the automatic transmission; and
control the automatic transmission when the engine start control is started during a downshift of the automatic transmission, to permit a lower gear position to be established according to the shift conditions, in a case where an inertia phase in which an input rotational speed of the automatic transmission is increased has not started, and the engine connecting and disconnecting device has been synchronized, as compared with a case where the inertia phase has not started, and the engine connecting and disconnecting device has not been synchronized.

8. The control device of the hybrid vehicle according to claim 7, wherein the electronic control unit is configured to control the engine and the engine connecting and disconnecting device to start the engine in a first starting method in which the engine performs ignition and rotates by itself after an engine speed as a rotational speed of the engine is increased to be equal to or higher than a predetermined rotational speed through slipping engagement of the engine connecting and disconnecting device.

* * * * *